(12) United States Patent
Akutsu

(10) Patent No.: US 8,542,385 B2
(45) Date of Patent: Sep. 24, 2013

(54) IMAGE PROCESSING APPARATUS, IMAGE PROCESSING SYSTEM, AND COMPUTER-READABLE RECORDING MEDIUM THEREOF

(75) Inventor: Toru Akutsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 143 days.

(21) Appl. No.: 12/929,558

(22) Filed: Feb. 1, 2011

(65) Prior Publication Data

US 2011/0188073 A1 Aug. 4, 2011

(30) Foreign Application Priority Data

Feb. 3, 2010 (JP) ................. 2010-021941

(51) Int. Cl.
*G06F 15/00* (2006.01)
(52) U.S. Cl.
USPC .................. 358/1.15; 358/1.13; 709/225
(58) Field of Classification Search
USPC ................. 358/1.15, 1.13; 709/225
See application file for complete search history.

(56) References Cited

U.S. PATENT DOCUMENTS

| 6,202,092 | B1 * | 3/2001 | Takimoto ............... 709/225 |
| 7,426,045 | B2 * | 9/2008 | Horiyama ............... 358/1.13 |
| 7,715,030 | B2 * | 5/2010 | Higashiura et al. ....... 358/1.14 |
| 7,760,382 | B2 | 7/2010 | Murata |
| 2005/0216514 | A1 | 9/2005 | Murata |
| 2009/0122347 | A1 * | 5/2009 | Utsubo et al. ........... 358/1.16 |

FOREIGN PATENT DOCUMENTS

| JP | 2004102356 A | 4/2004 |
| JP | 2005271317 A | 10/2005 |
| JP | 2009043247 A | 2/2009 |

* cited by examiner

*Primary Examiner* — King Poon
*Assistant Examiner* — Andrew H Lam
(74) *Attorney, Agent, or Firm* — Harness, Dickey & Pierce, P.L.C.

(57) ABSTRACT

An image processing apparatus is disclosed, including: a managing part, a use amount storing part, a setting part, and a determining part. The managing part manages a group threshold of a group including multiple members allowed to use the function for a use amount of the function. The use amount storing part stores a value of the use amount for each member. The setting part allocates the group threshold to the multiple members based on a value of a priority for each member in the group, and sets a member threshold for each member. The determining part determines whether a restriction concerning a use of the function is applied to a process of a use request, based on a result from comparing the value of the use amount with the member threshold for the request originator in response to the use request of the function.

20 Claims, 19 Drawing Sheets

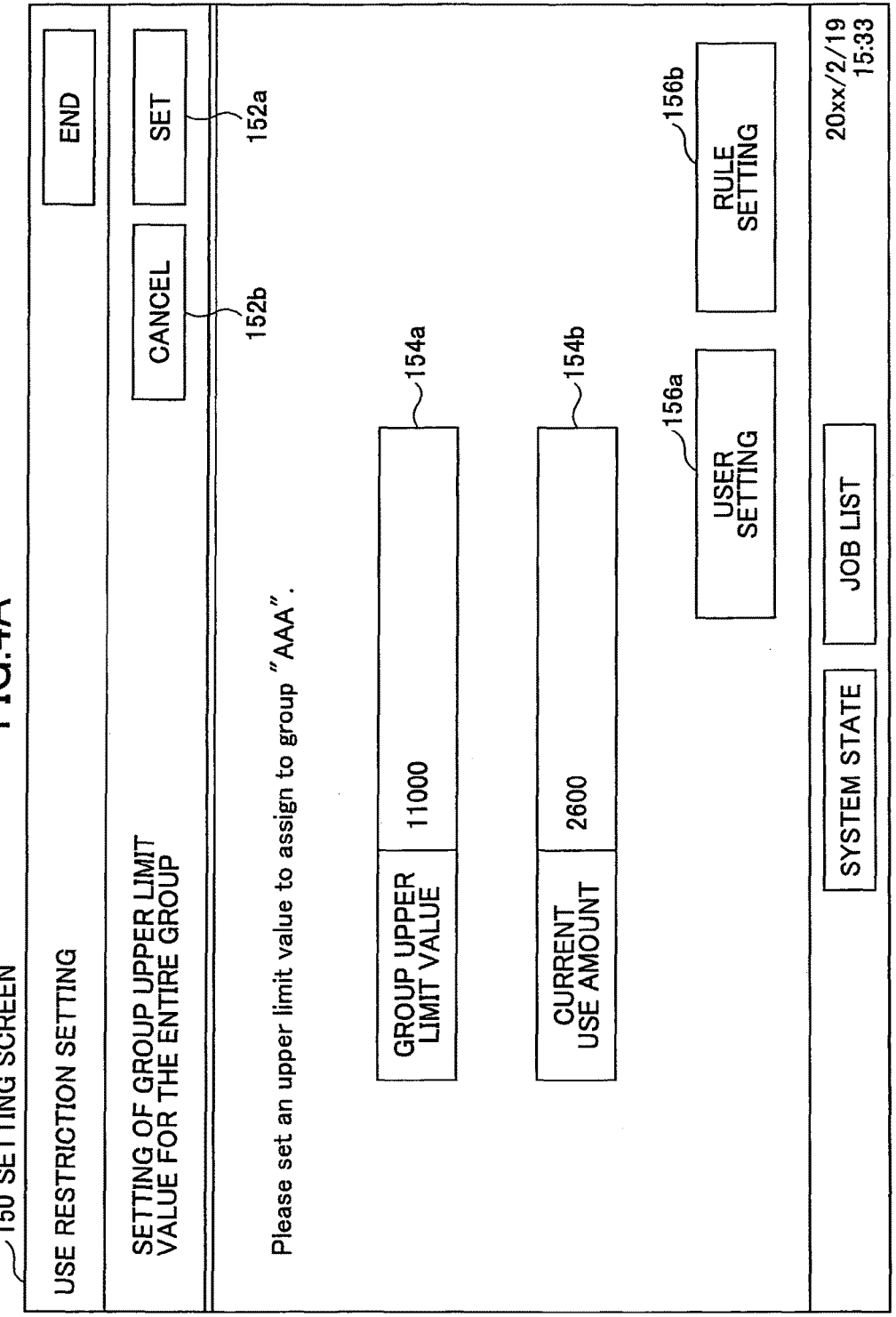

FIG.4B

160 SETTING SCREEN

USE RESTRICTION SETTING

SETTING OF RULE TO APPLY TO GROUP

Please select rules to apply to group "AAA".
The use restriction is enforced in accordance with the selected rules if a user reaches the upper limit value in group "AAA".

| | NUMBER | RULE |
|---|---|---|
| ☐ | 1 | [FORCIBLE] DOUBLE-SIDED BLACK AND WHITE PRINT |
| ☒ | 2 | [FORCIBLE] DOUBLE-SIDED PRINT |
| ☒ | 3 | POPUP ALARM |
| ☐ | 4 | MAIL NOTIFICATION |

166a  166b  166c  164

CANCEL  162b
SET  162a
END

SYSTEM STATE   JOB LIST

170A SETTING SCREEN

USE RESTRICTION SETTING | CANCEL 172b | SET 172a | END

SETTING OF USER UPPER LIMIT VALUE IN GROUP

The group upper limit value of the group "AAA" is 11000 sheets.
Please set a weight value for each of users in the group "AAA".

174

| SELECTION | USER NAME | FIX | WEIGHT | USER UPPER LIMIT VALUE | CURRENT USE AMOUNT | AUTOMATION |
|---|---|---|---|---|---|---|
| ☐ | USER A | ☐ | 1 | 2200 | 520 | |
| ☐ | USER B | ☐ | 2 | 4400 | 1040 | |
| ☐ | USER C | ☐ | 1 | 2200 | 510 | |
| ☐ | USER D | ☐ | 1 | 2200 | 530 | ○ |

174e  174f  176a  176b  174p  174q  174r

ADD USER 178a | DELETE USER 178b

SYSTEM STATE | JOB LIST

170B SETTING SCREEN

USE RESTRICTION SETTING | CANCEL 172b | SET 172a | END

SETTING OF USER UPPER LIMIT VALUE IN GROUP

The group upper limit value of the group "AAA" is 11000 sheets.
Please set a weight value for each of users in the group "AAA".

| SELECTION | USER NAME | FIX | WEIGHT | USER UPPER LIMIT VALUE | CURRENT USE AMOUNT | AUTOMATION |
|---|---|---|---|---|---|---|
| ☐ | USER A | ☒ | — | 5000 | 520 | |
| ☐ | USER B | ☐ | 3 | 3000 | 1040 | |
| ☐ | USER C | ☐ | 1 | 1000 | 510 | |
| ☐ | USER D | ☐ | 2 | 2000 | 530 | |

174e  174f  176a  176b  174p  174q  174r

ADD USER 178a  DELETE USER 178b

SYSTEM STATE | JOB LIST

180 OPERATION SCREEN

Please input your user name and password to use this apparatus.

USER NAME | USER A | — 182

PASSWORD | ******** | — 184

AUTHENTICATE — 186

SYSTEM STATE | JOB LIST

20xx/2/19
15:33

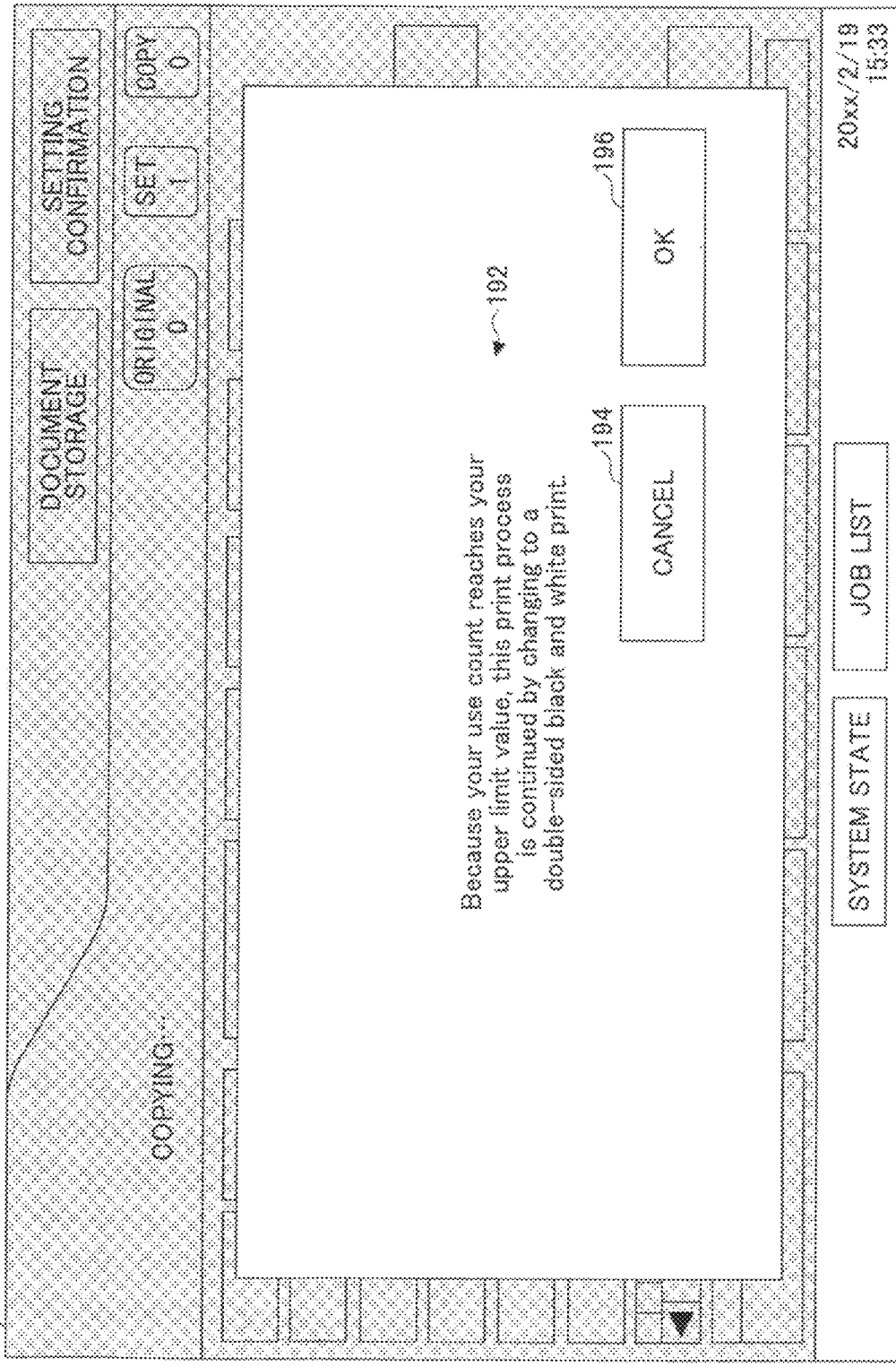

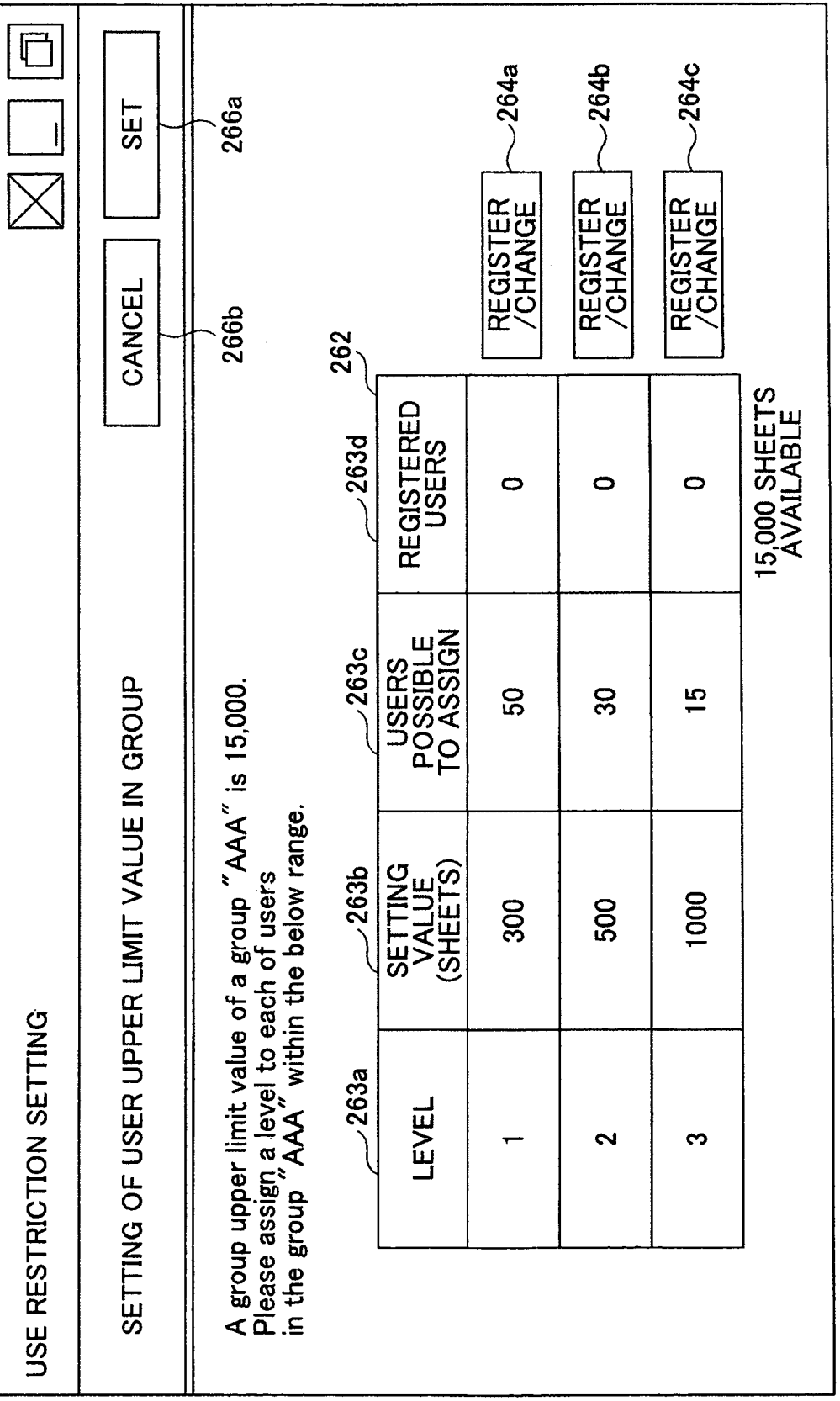

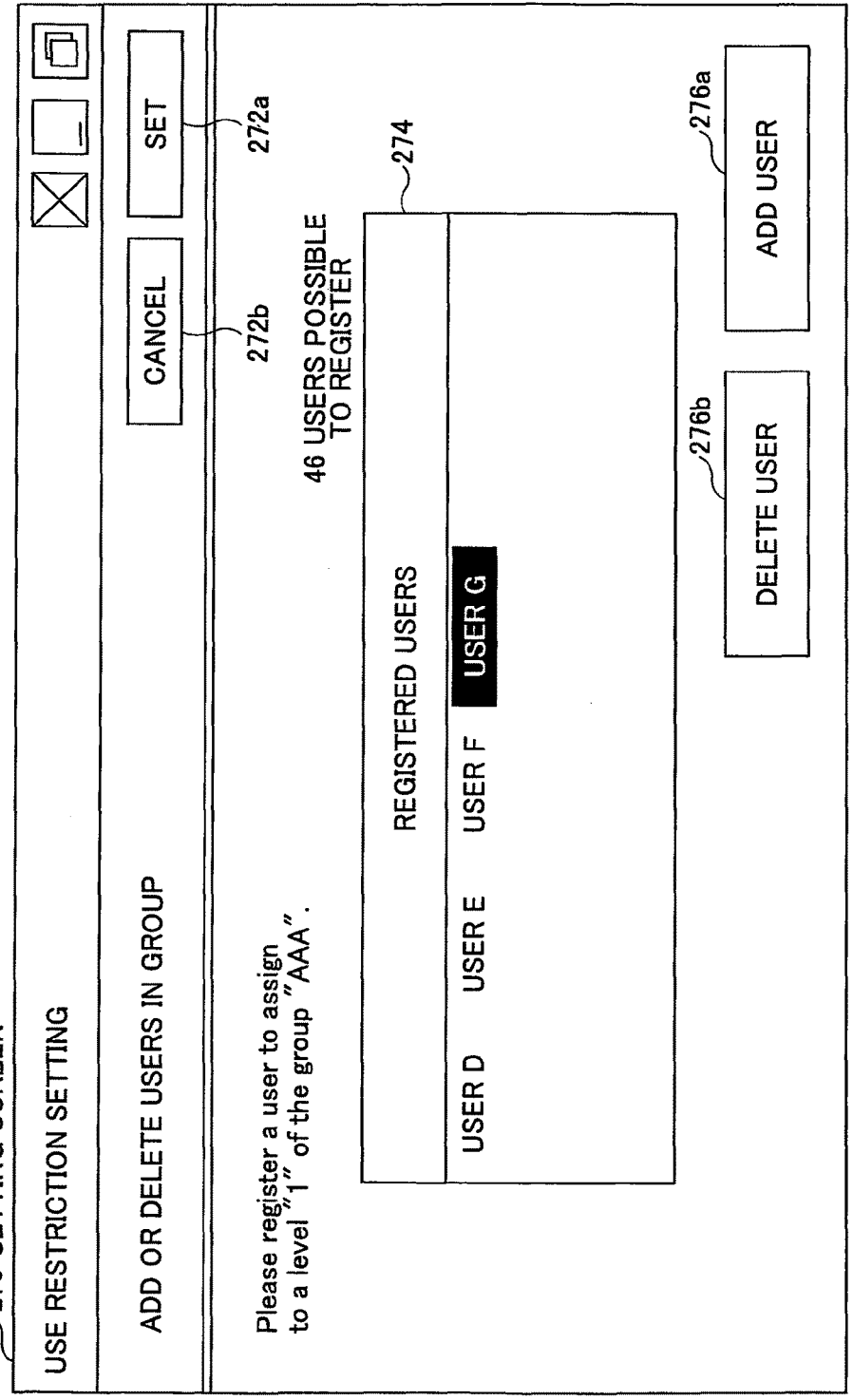

FIG.12

260B SETTING SCREEN

USE RESTRICTION SETTING

SETTING OF USER UPPER LIMIT VALUE IN GROUP

CANCEL — 266b    SET — 266a

A group upper limit value of a group "AAA" is 15,000.
Please assign a level to each of users
in the group "AAA" within the following range.

| LEVEL — 263a | SETTING VALUE (SHEETS) — 263b | USERS POSSIBLE TO ASSIGN — 263c | REGISTERED USERS — 263d | |
|---|---|---|---|---|
| 1 | 300 | 38 | 5 | REGISTER/CHANGE — 264a |
| 2 | 500 | 23 | 2 | REGISTER/CHANGE — 264b |
| 3 | 1000 | 11 | 1 | REGISTER/CHANGE — 264c |

15,000 SHEETS AVAILABLE

FIG.13

| USER NAME | TOTAL UPPER LIMIT VALUE | TOTAL USE AMOUNT | UPPER LIMIT VALUE OF COLOR PRINT | USE AMOUNT OF COLOR PRINT | UPPER LIMIT VALUE OF SINGLE-SIDED PRINT | USE AMOUNT OF SINGLE-SIDED PRINT | UPPER LIMIT VALUE OF REGULAR PRINT | USE AMOUNT OF REGULAR PRINT |
|---|---|---|---|---|---|---|---|---|
| ... | ... | ... | ... | ... | ... | ... | ... | ... |
| USER A | 1000 | 600 | 400 | 320 | 500 | 350 | 800 | 550 |
| ... | ... | ... | ... | ... | ... | ... | ... | ... |

| USER NAME | TOTAL UPPER LIMIT VALUE | TOTAL USE AMOUNT | UPPER LIMIT VALUE OF COLOR PRINT | USE AMOUNT OF COLOR PRINT | UPPER LIMIT VALUE OF SINGLE-SIDED PRINT | USE AMOUNT OF SINGLE-SIDED PRINT | UPPER LIMIT VALUE OF REGULAR PRINT | USE AMOUNT OF REGULAR PRINT |
|---|---|---|---|---|---|---|---|---|
| ... | ... | ... | ... | ... | ... | ... | ... | ... |
| USER A | 1000 | 620 | 400 | 420 | 500 | 350 | 800 | 570 |
| ... | ... | ... | ... | ... | ... | ... | ... | ... |

IMAGE PROCESSING APPARATUS, IMAGE PROCESSING SYSTEM, AND COMPUTER-READABLE RECORDING MEDIUM THEREOF

BACKGROUND OF THE INVENTION

1. Field of the Invention

The present invention is related to a technology to restrict use of an image processing apparatus, and more particularly to an image processing apparatus, an image processing system, and a computer-readable recording medium thereof, in which utilization restriction is effectively and flexibly conducted with respect to an image processing function.

2. Description of the Related Art

Recently, due to increase of environment consideration and a higher requirement of expense reduction, in organizations including many members such as government and public offices, universities, companies, and the like, technologies have been installed in which an apparatus is restricted to be used at a group unit such as a department, a section, or the like, or for each member as one unit. For example, as a print system, an upper limit value is set to limit the number of sheets for each group including multiple users or each user in an office. It is restricted to conduct prints greater than the upper limit value. Otherwise, an alarm is displayed for a user to comply with the upper limit value.

For example, Japanese Laid-open Patent Application No. 2004-102356 discloses a print system corresponding to a network, which includes an authentication server and a print restriction server. Authentication information for each user, the number of print result sheets, and an upper limit number of sheets to print are registered to the authentication server. The print restriction server acquires the authentication information corresponding to a user, the number of the print result sheets, and the upper limit number of sheets. When a print job is issued from a client terminal, the print restriction server determines whether or not a print is permitted based on the authentication information of the user and the number of the upper limit number of sheets. According to a technology disclosed in Japanese Laid-open Patent Application No. 2004-102356, a user can recognize the number of remaining sheets allowed to print, and it is informed to the user about what time a print is restricted so that the user can be always conscious about unnecessary paper outputs.

Moreover, Japanese Laid-open Patent Application No. 2005-271317 discloses an image forming apparatus which receives an input of a user ID when performing a copy process, inquires a department ID of a department to which a user belongs by sending the received user ID to a department management server, conducts the copy process by the department ID received from the department management server, and registers the number of copy sheets by associating with the department ID. According to a technology disclosed in Japanese Laid-open Patent Application No. 2005-271317, the number of print sheets can be counted for each group.

Furthermore, in a case in which an administrator manually sets the upper limit value for each user, settings can be defined in detail. However, it is complicated work to determine the upper limit value for each user in the same group by considering a group upper limit value, and it is not practical if the group is a large group. That is, if the number of members being registered to a group is increased, it is complicated work to conduct detailed settings in response to a behavior of each user so as not to exceed a group upper limit value and not to be extremely lower than the group upper limit value. This complicated work requires a significant amount of workload.

Moreover, in a case in which a user is additionally registered, a user registration is deleted, the group upper limit value is changed, the group upper limit value is required to be set again. Thus, the workload of the administrator is further increased.

Moreover, for example, in a case in which the upper limit value is set for the number of print sheets, in addition to multiple setting items for a single-sided print, a double-sided print, an integrated print to print two or more pages in one side of a sheet, and a black and white/color print, managements concerning use of toner and a use amount of sheets are required.

Moreover, under the upper limit value set for a user, the user does not always print a similar amount of sheets in a certain term. Temporarily, the user needs to print out sheets greater than the upper limit value. The above-described technologies cannot flexibly correspond to this requirement.

On the other hand, in a viewpoint of the administrator, there are many demands such that the upper limit value for use of the image forming apparatus is strictly managed, such that the upper limit value is managed as a rough target to improve user recognition, or such that the upper limit value is flexibly managed in a short term and the upper limit value may be achieved as a target in a long term. However, the above-described technologies cannot realize a flexible and effective use restriction of functions for each group or each user in an organization.

That is, as described above, if the administrator attempts to manage a use amount concerning use of functions of the image forming apparatus in detail and complicatedly, a workload of the administrator is increased.

SUMMARY OF THE INVENTION

The present invention solves or reduces one or more of the above problems.

In an aspect of this disclosure, there is provided an image processing apparatus including a function concerning an image process, including a managing part configured to manage a group threshold for a use amount of the function, in which the group threshold is assigned to a group including multiple members who are allowed to use the function; a use amount storing part configured to store a value of the use amount for each of the multiple members; a setting part configured to allocate the group threshold to the multiple members based on a value of a priority which is determined for each of the multiple members in the group, and to set a member threshold for each of the multiple members; and a determining part configured to determine whether or not a restriction concerning a use of the function is applied to a process of a use request, based on a result from comparing the value of the use amount of a member of a request originator, which is stored in the use amount storing part, with the member threshold of the member in response to the use request of the function.

In another aspect of this disclosure, there is provided an image processing apparatus which includes a function concerning an image process, and a server which restricts a use of the function, wherein the server includes a managing part configured to manage a group threshold for a group use amount of the function which is allocated to a group including multiple members who are allowed to use the function; a use amount storing part configured to store a value of a member use amount for each of the multiple members; and a setting part configured to allocate the group threshold to the multiple members in the group based on a value of a priority determined to each of the multiple members, and to set a member threshold for each of the multiple members, and wherein the image processing apparatus includes a determining part configured to determine whether or not the restriction concerning the use of the function is applied to a process of a use request, based on a result from comparing the value of the member use amount of a member being a request originator, which is stored in the member use amount storing part, with the member threshold of the member in response to the use request of the function.

In a further aspect of this disclosure, there is provided a computer-readable recording medium storing executable instructions, which when executed by a computer, causes the computer to perform: managing a group threshold for a use amount of the function, in which the group threshold is assigned to a group including multiple members who are allowed to use the function; storing a value of the use amount for each of the multiple members; allocating the group threshold to the multiple members based on a value of a priority which is determined for each of the multiple members in the group, and setting a member threshold for each of the multiple members; and determining whether or not a restriction concerning a use of the function is applied to a process of a use request, based on a result from comparing the value of the use amount of a member of a request originator which is stored, with the member threshold of the member in response to the use request of the function.

BRIEF DESCRIPTION OF THE DRAWINGS

In the following, embodiments of the present invention will be described with reference to the accompanying drawings.

FIG. 4A and FIG. 4B are diagrams illustrating setting screens for a group displayed at a touch panel of the operation panel according to the first embodiment;

FIG. 5A and FIG. 5B are diagrams illustrating setting screens for users displayed at the touch panel of the operation panel according to the first embodiment;

FIG. 6A and FIG. 6B are diagrams illustrating operation screens displayed at the touch panel of the operation panel according to the first embodiment;

FIG. 11A and FIG. 11B are diagrams illustrating setting screens displayed at an administrator terminal according to the second embodiment;

FIG. 12 is a diagram illustrating a setting screen displayed at the administrator terminal according to the second embodiment;

FIG. 13 is a diagram illustrating a data structure of a use management table stored in the storing part according to the second embodiment;

DESCRIPTION OF THE PREFERRED EMBODIMENTS

In the following, embodiments according to the present invention will be described with reference to the accompanying drawings. The embodiments according to the present invention are not limited to the following described embodiments. Hereinafter, in the embodiments, a network system including a multi-functional apparatus, an authentication server, an administrator terminal, and an operator terminal, which are mutually connected through a network, will be described as an example of an image processing system including an image processing apparatus.

Figure 1:
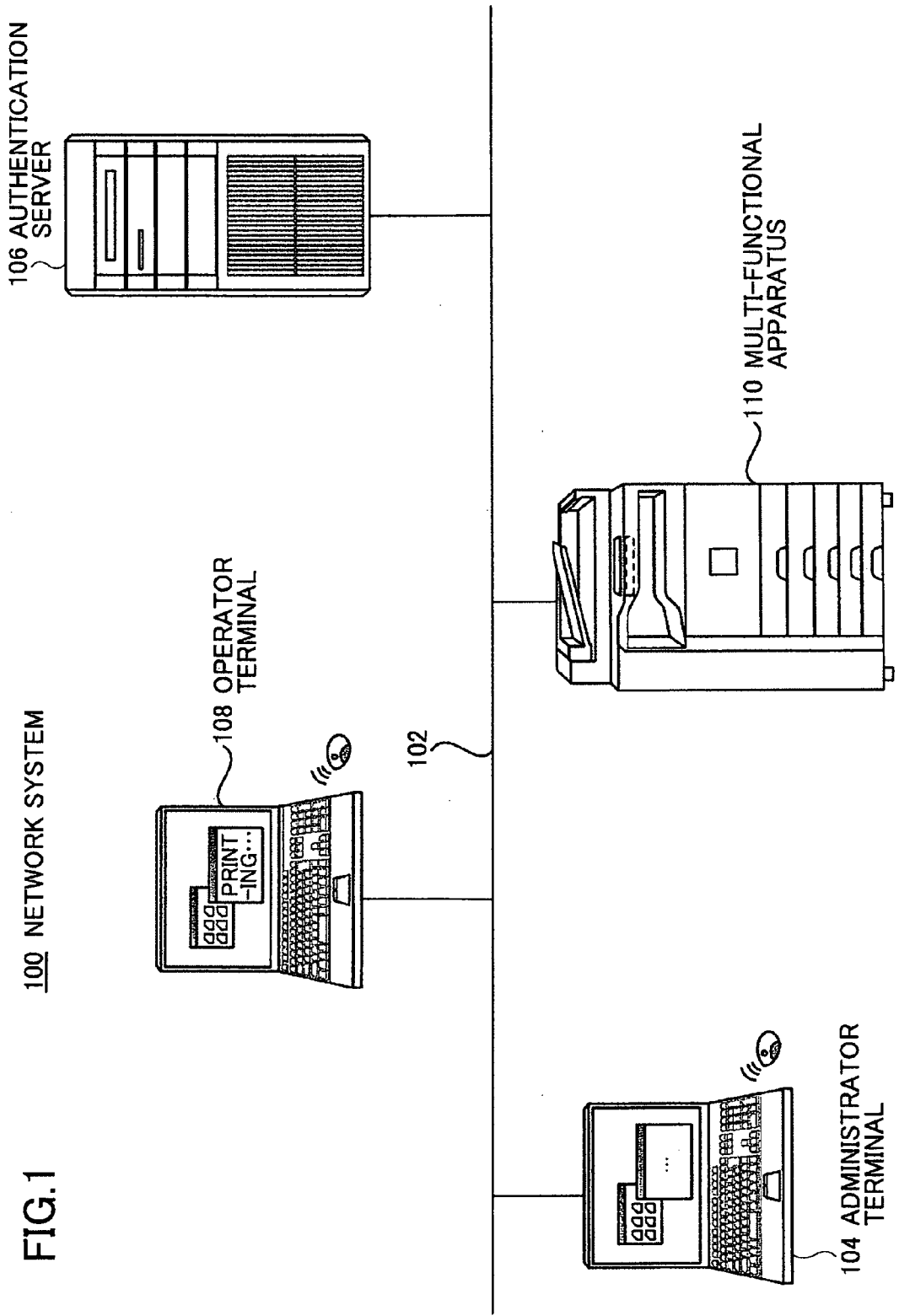
FIG. 1 is a schematic diagram illustrating a network system according to a first embodiment.

FIG. 1 is a schematic diagram illustrating a network system 100 according to a first embodiment. The network system 100 illustrated in FIG. 1 is mutually connected to an administrator terminal 104, an authentication server 106, an operator terminal 108, and a multi-functional apparatus 110 through a network 102.

The network 102 may be a LAN (Local Area Network) communicating by a transaction protocol such as Ethernet, a TCP/IP (Transmission Control Protocol/Internet Protocol), or the like, a VPN (Virtual Private Network), WAN (Wide Area Network) using a dedicated line, or the like. However, the network 102 is not limited to the above network architectures, and may include the Internet connected via routers (not shown). Alternatively, the network 102 may be a wired or wireless network, or a mixed network.

The multi-functional apparatus 110 includes at least one function concerning a print function, a copy function, a scanner function, a facsimile function, or/and the like, and also includes a use restriction application which will be described in detail later. It should be noted that the multi-functional apparatus 110 provides an image processing apparatus according to the first embodiment. In the following, an example of a use restriction will be described in a case of using the print function and the copy function in functions related to an image process. However, for example, use of the facsimile function may be restricted, since communication expense and the like occur for sending by fax and sheets are output for receiving by fax. Also, a use of the scanner function may be restricted. Furthermore, recently, there are multi-functional apparatuses possible to mount various applications and also possible to use other applications provided in an external network. In this configuration, a metered rate system is applied in which expense is charged depending on a use amount (a count of use, used data amount, and the like) of these applications. In this case, the expense is charged for an application use amount such as traffic, a data amount, and the like. Also, regarding restriction of a use amount, other than the number of print sheets, a point or a frequency necessary for a use of each function is defined, and the use restriction is performed by using the point or the frequency which is given in a predetermined term.

The administrator terminal 104 is a terminal allowed to access to a setting management function of the multi-functional apparatus 110 through a remote management interface which is provided by the multi-functional apparatus 110, and can be used by an administrator 4 (FIG. 3) for various settings of the applications which are restricted to use. Also, the administrator 4 uses an operation panel of the multi-functional apparatus 110 to conduct various settings for a use restriction management.

The operator terminal 108 is a terminal which an operator 8 (FIG. 3) can use when the user uses the function provided by the multi-functional apparatus 110. For example, the operator terminal 108 can receive a print instruction of a document, which is created by a document creation application, from the operator 8, and can send a print request of the document to the multi-functional apparatus 110 through a printer driver. Data of the print request sent from the operator terminal 108 is temporarily stored in a hard disk drive (hereinafter, referred to as HDD), a memory, a storage unit, or a like mounted in the multi-functional apparatus 110. Then, the print request is timely processed by the multi-functional apparatus 110. In a case in which it is indicated to store a print job, the print job is conducted when an indication to output is explicitly made by a user who logged in to the multi-functional apparatus 110. Also, the user can use the functions provided by the multi-functional apparatus 110 by using the operation panel of the multi-functional apparatus 110.

The authentication server 106 manages potential users of the network system 100, and provides an authentication function for the user to use an apparatus which belongs to the network system 100 such as the multi-functional apparatus 110. For example, the potential users may be employees or the like who belong to an organization. In the following, the operator 8 is a person who actually operates the multi-functional apparatus 110, and a user is the operator 8 who is identified in the network system 100. Users in the network system 100 are hierarchically managed by assigning a user name to identify each of the users and a group based on a division of each of the operators 8 as the users.

When the multi-functional apparatus 110 receives inputs of the user name and a password from the operator 8 who attempts a login by using the operation panel, the multi-functional apparatus 110 confirms a validity of the user name and the password by associating with the authentication server 106, and recognizes the operator 8 to be a valid user in the network system 100. In the following, for the sake of convenience, the first embodiment will be in a case of using a password authentication as an example. However, it should be noted that a use restriction function according to the first embodiment can be applied to any type of authentications including an IC card authentication, a biological authentication, and the like. Next, a hardware configuration of the multi-functional apparatus 110 will be described.

Figure 2:
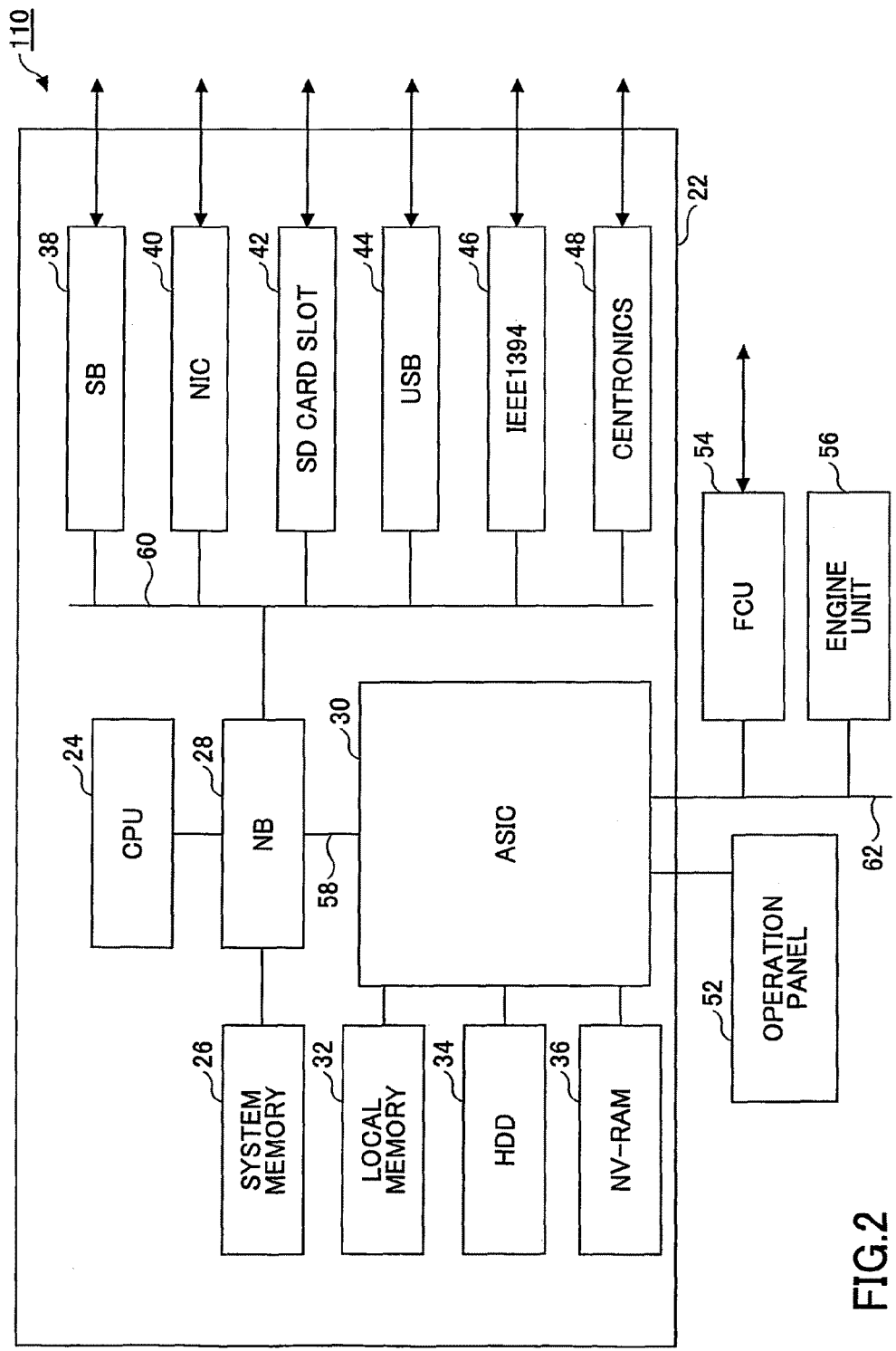
FIG. 2 is a diagram illustrating an example of a hardware configuration of a multi-functional apparatus according to the first embodiment.

FIG. 2 is a diagram illustrating an example of the hardware configuration of the multi-functional apparatus 110. The multi-functional apparatus 110 includes a controller 22, an operation panel 52, an FCU (Facsimile Control Unit) 54, and an engine part 56. The controller 22 includes a CPU (Central Processing Unit) 24, an NB (North Bridge) 28, an ASIC (Application Specified IC) 30 connected to the CPU 24 via the NB 28, and a system memory 26. The ASIC 30 is an IC to execute various image processes, and is connected to the NB 28 via an AGP (Accelerated Graphic Port) 58. The system memory 26 is used as an image drawing memory.

The ASIC 30 is connected to a local memory 32, an HDD 34, and an NV-RAM (non-volatile memory) 36 such as a flash memory. The HDD 34 is used to store a program of the use restriction application which will be described later, font data, form data, and the like. The NV-RAM 36 stores a program to control the multi-functional apparatus 110, and various settings of the use restriction application. The system memory 26 and the local memory 32 include working areas to provide more than one function related to the image process.

The controller 22 further includes an SB (South Bridge) 38, an NIC (Network Interface Card) 40, a SD (Secure Digital) card slot 42, a USB interface 44, an IEEE 1394 interface 46, and a centronics interface 48, which are connected to the NB 28 via a PCI bus 60. The NIC 40 is a network interface device to connect the multi-functional apparatus 110 to the network 102 such as the Internet or the LAN, and receives a print job request from the operator terminal 108 through the network 102.

The FCU 54 and the engine part 56 are connected to the ASIC 30 via a PCI bus 62. The FCU 54 conducts a communication method in accordance with a facsimile communication standard such as G3 or G4, and provides a facsimile function. The engine part 56 receives a print instruction or a scanner instruction issued by an application, and conducts an image forming process or an image scan process, and provides the print function, the copy function, or the scanner function.

The operation panel 52 is connected to the ASIC 30 in the controller 22. The operation panel 52 is a user interface device to receive inputs for various instructions from the operator 8 and to display information in a screen. The operation panel 52 provides user interfaces for the operator 8 to log in to the network system 100, to use each of functions of the multi-functional apparatus 110, to display various notices, and to accept various instructions. The above-described functions of the multi-functional apparatus 110 are used by the operator 8 from the operator terminal 108 through the network 102 or through the operation panel 52 of the multi-functional apparatus 110.

Figure 3:
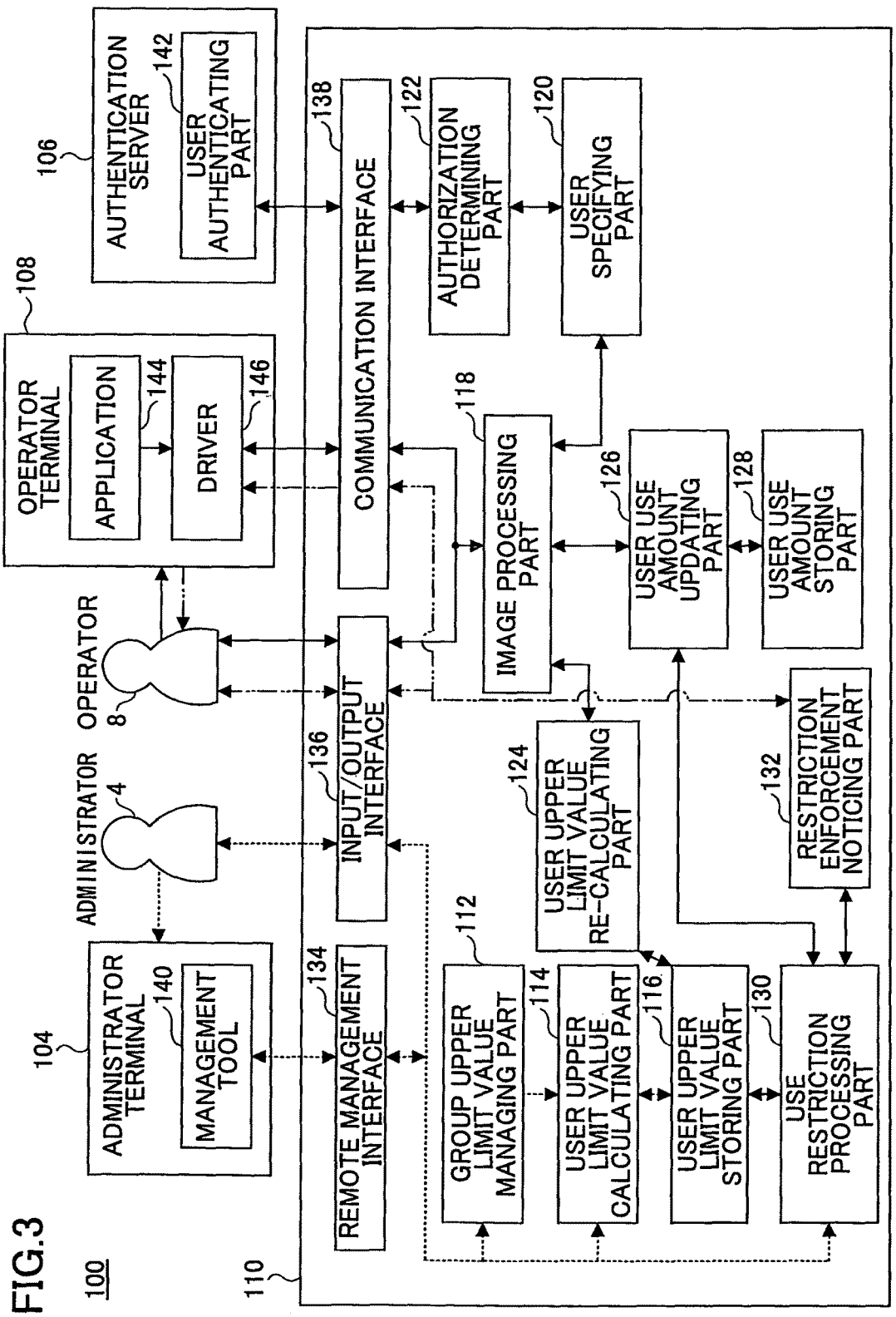
FIG. 3 is a block diagram illustrating a functional configuration of the multi-functional apparatus realized in the network system according to the first embodiment.

In the following, a functional configuration of the multi-functional apparatus 110 will be described. FIG. 3 is a block diagram illustrating the functional configuration of the multi-functional apparatus 110 realized in the network system 100 according to the first embodiment. As described above, in the network system 100 according to the first embodiment, the users are hierarchically managed, and each of the users belongs to any group in an upper layer.

In the use restriction application in the first embodiment, thresholds respective to the user unit and the group unit are set for a use amount of the copy function and the print function (hereinafter, collectively called print function) provided by the multi-functional apparatus 110. In the first embodiment, each of the thresholds is set to be the upper limit value for the use amount. Alternatively, thresholds at several stages are set so that a threshold for an alarm and the upper limit value may be separately set.

The upper limit value of the user unit is controlled so that a total of the upper limit values for the users in the group is within an upper limit value of the group unit. There are some users in the same group who are not planned to use the print function. Accordingly, in the first embodiment, instead of assigning the upper value of the use amount to all users registered in the same group in a hierarchical management, the administrator 4 indicates users to assign the upper value. On the other hand; in a case in which the network system 100 recognizes a user to whom the upper limit value is not assigned, the upper limit value of the user unit is re-calculated for users including this user in the same group. Since the upper limit value is not assigned to the user who is not planned to use the print function, it is possible to appropriately allocate the upper limit value to each of the users who use the print function. In addition, in a case in which the user, who is not planned to use the print function, temporarily needs to use the print function, as far as the user belongs to the group as the valid user, the user is allowed to use the print function.

In the first embodiment, the hierarchical management, which is formed by two layers: a user layer and group layer, will be described as an example. Alternatively, the hierarchical management may be formed by a first layer for managing users, a second layer for managing groups including the users of the first layer, and a third layer for managing upper groups including the groups of the second layer as further members. In this case, the upper limit values assigned to members in each layer (the users in the first layer, and the groups in the second layer) are managed so that a total of the upper limit values for the members is within an upper limit value of a group to which the members belong.

In order to realize the use restriction for the user unit and the group unit, the multi-functional apparatus 110 according to the first embodiment includes a group upper limit value managing part 112 for managing a group upper limit value assigned to each of the groups, a user upper limit value calculating part 114 for calculating and setting the user upper limit value for each of the users for each of the groups, and a user upper limit value storing part 116 for storing the user upper limit value calculated by the user upper limit value calculating part 114.

The group upper limit value managing part 112 manages the group upper limit value. The group upper limit value is defined beforehand based on a use behavior of each groups, such as the division, the section, or the like in the organization. The user upper limit value calculating part 114 allocates the group upper limit value to each of the groups and calculates the user upper limit value in accordance with a weight value, which is given to each of the users beforehand, within a range in which a total of the user upper limit values for the users belonging to the same group does not exceed the group upper limit value. The calculated user upper limit value corresponding to each of the users are stored in the user upper limit value storing part 116. The above-described weight value defines a priority of the users to assign the user upper limit value of the use amount of the print function. Thus, instead of the weight value, a level or the like may be used.

Each of the group upper limit value managing part 112 and the user upper limit value calculating part 114 provides a user interface through a remote management interface 134 or an input/output interface 136 included in the multi-functional apparatus 110. By each user interface, it is possible to set various items concerning the group upper limit value, the weight value for each user, and the like. For example, the remote management interface 134 is provided by the NIC 40 and software such as a web server function for generating pages for various setting management screens. For example, the input/output interface 136 is provided by the operation panel 52 (FIG. 2) including a touch panel and hard keys, and software for conducting a display control and an operation control for the various setting management screens on the operation panel 52.

The administrator 4 directly accesses the group upper limit value managing part 112 and the user upper limit value calculating part 114 through the input/output interface 136, and conducts various settings as described above. On the other hand, in a case of remotely managing the various settings from the administrator terminal 104, the administrator 4 uses a management tool 140, which is realized to be a browser or a dedicated application on the administrator terminal 104, and accesses the group upper limit value managing part 112 and the user upper limit value calculating part 114 through the remote management interface 134. The group upper limit value managing part 112 and the user upper limit value calculating part 114 are examples to provide a managing part and a setting part, respectively, in the first embodiment.

FIG. 4A and FIG. 4B are diagrams illustrating setting screens for the group displayed at the touch panel of the operation panel 52. FIG. 4A illustrates a setting screen which is provided by the group upper limit value managing part 112 to set the group upper limit value which is assigned to the entire group. A setting screen 150 illustrated in FIG. 4A includes a text box 154a for accepting an input of the group upper limit value to be assigned to the entire group, a text box 154b for displaying an aggregation of the use amounts of the users in a current group, a "SET" button 152a for accepting an instruction to reflect setting contents, and a "CANCEL" button 152b for accepting an instruction of cancelling the setting contents. By using the setting screen 150, the administrator 4 changes a value in the text box 154a by using a software keyboard or the hard keys, touches the "SET" button 152a, and changes a setting of the group upper limit value of the group.

The setting screen 150 illustrated in FIG. 4A further includes a "USER SETTING" button 156a for calling a function to display a setting screen on which the user upper limit value is determined, and a "RULE SETTING" button 156b for calling a function to display a setting screen to indicate a rule which is to be applied. Details of rules to be applied will be described later. When the "USER SETTING" button 156a is touched, the setting screen illustrated in FIG. 5A is called.

FIG. 5A and FIG. 5B are diagrams illustrating setting screens for the users displayed at the touch panel of the operation panel 52. FIG. 5A illustrates a setting screen which is provided by the user upper limit value calculating part 114 to set the group upper limit value which is assigned to the entire group. A setting screen 150 illustrated in FIG. 5A includes a table 174 for displaying the user upper limit value which is calculated based on a weight value when the weight value is set for each of the users in the group, a "ADD USER" button 178a, a "DELETE USER" button 178b, a "SET" button 172a, and a "CANCEL" button 172b.

The table 174 includes a column 174f for indicating a user name of a user to whom the user upper limit value is set in a present state in the users in the same group, a column 176b for accepting an input of the weight value for the user, a column 174p for displaying the user upper limit value calculated from the weight value, and a column 174q for displaying the use amount being aggregated for all users in the present state in a term. At the setting screen 170A illustrated in FIG. 5A, the administrator 4 changes the weight value in the column 176b by using the hard keys or the like, and touches the "SET" button 172a, so as to change and set the user upper limit value by a result calculated based on the weight value.

The table 174 of the setting screen 170A illustrated in FIG. 5A further includes a check box 176a for indicating whether the user upper limit value of the users is set to be a fixed value or to be a value calculated with the weight value. The administrator 4 sets the user upper limit value to be the fixed value for a specific user by checking the check box 176a. Therefore, it is possible to assure the number of necessary sheets.

The table 174 further includes a column 174r indicating whether the user is manually set and registered by the administrator 4 and is automatically recognized and added. By referring to a value of the column 174r, the administrator 4 can determine whether the user is a user for whom the weight value is manually set or a user who is added by an automatic recognition in the network system 100. An addition by the automatic recognition will be described later in detail.

The table 174 further includes a column 174e for selecting one or more users to delete from the table 174.

FIG. 5B illustrates a setting screen 170B displayed after the weight value is changed and a check is made for the user upper limit value to be the fixed value by using the setting screen 170A illustrated in FIG. 5A. When a check is made to the check box 176a to indicate the fixed value as illustrated in FIG. 5B, the user upper limit value can be directly indicated. When the weight value of each of the users is changed, the user upper limit value is re-calculated depending on a change of the weight value. A calculation result illustrated in FIG. 5B indicates that the fixed value (5000 sheets of a user A) is deducted from the group upper limit value (11000 sheets) assigned to the group, and a difference (6000 sheets) are divided proportionally based on the weight values for users to whom the fixed value is not indicated. If there is a fraction, the fraction may be additionally provided to a user having a greatest weight value, or the administrator 4 may appropriately allocate the fraction to the users. The user upper limit value, which is calculated on the setting screen 170B, is a value irrelevant to an actual result of the user such as a current use amount, or the like.

Moreover, if the administrator 4 manually adds a user by using the "ADD USER" button 178a, each of the user upper limit values is re-calculated. In this case, there may be a user appeared in which the current use amount exceeds the user upper limit value resulted from the re-calculation. The re-calculation may be repeated after the user exceeding the user upper limit value is excluded, and the use amount of the user is deducted from the group upper value.

If the administrator 4 manually selects a user and manually deletes a record of the user by using the "DELETE USER" button 178b, since there is the use amount which the user to be deleted actually used, the re-calculation is conducted based on the weight value after the use amount of the user to be deleted is deducted from the group upper limit value. Instead, a difference between the user upper value and the use amount of the user to be deleted is divided equally or based on the weight value, and additionally allocated to each of users other than the user to be deleted. The use amount of the user to be deleted is recorded with the user name even after the record of the user is deleted from the table 174. Thus, if a record for the same user is added again in the table 174 after the deletion, the use amount being recorded for the user is retrieved in the table 174, and each of the user upper limit values is re-calculated.

Referring to FIG. 3 again, the multi-functional apparatus 110 according to the first embodiment further includes an image processing part 118 for conducting an image process in response to a print request or a copy request (hereinafter, requests to use these print functions are collectively called print requests), a user specifying part 120 for specifying a user as a request originator, an authorization determining part 122 for determining an authorization of the specified user being the request originator by communicating with the user authenticating part 142 of the authentication server 106, and a user upper limit value re-calculating part 124. The image processing part 118 starts the image process in response to a print request which is received from the operator 8 through the input/output interface 136. In a case in which the operator 8 uses the operator terminal 108, and the print request is made when a driver 146 is called by an application 144, the image processing part 118 starts the image process in response to the print request received through a communication interface 138.

The user specifying part 120 acquires authentication information from the operator 8 by displaying a screen which requests the operator 8 to input a user name and a password or a screen which requests the operator 8 to insert an IC card. Otherwise, the user specifying part 120 extracts the authentication information from job data of the print request, and specifies the user as the request originator sending the print request or the copy request.

FIG. 6A and FIG. 6B are diagrams illustrating operation screens displayed at the touch panel of the operation panel 52. FIG. 6A illustrates an example of an operation screen to request the operator 8 to input the user name and the password. An operation screen 180 illustrated in FIG. 6A includes a text box 182 to input the user name, a text box 184 to input the password, and an "AUTHENTICATE" button 186 to instruct authenticating the operator 8. At the operation screen 180 illustrated in FIG. 6A, the operator 8 inputs the user name in the text box 182 and the password in the text box 184 by using the software keyboard or the like, and touches the "AUTHENTICATE" button 186, so as to instruct a login authentication.

Back to FIG. 3, the authorization determining part 122 sends the authentication information of the user being the request originator who is specified by the user specifying part 120 to the user authenticating part 142 of the authentication server 106 through the communication interface 138, and inquires a validity of the user. The user authenticating part 142 of the authentication server 106 manages the authentication information including the user name and the password, and conducts an authentication process for a logged-in user in response to the inquiry received from the multi-functional apparatus 110. After the user is authenticated as a valid user, the user successfully logs into the multi-functional apparatus 110 and is allowed to use the functions of the multi-functional apparatus 110.

The user upper limit value re-calculating part 124 determines whether or not the user upper limit value is set for the user specified as the request originator. In a case in which the user upper limit value is not set, a default weight value is assigned to the user specified as the request originator, and the user upper limit value is re-calculated for each of the users including the user of the request originator, who is added, in a group to which the user belongs. That is, in the first embodiment, there is one manner in which the weight value is manually set for each of the users by the administrator 4 and the user upper limit value is calculated for each of the users, and another manner in which the network system 100 automatically recognizes an addition of the user, sets a default weight value, and calculates the user upper limit value. The user upper limit value re-calculating part 124 is an example to provide a re-calculating part in the first embodiment.

The multi-functional apparatus 110 according to the first embodiment further includes a user use amount updating part 126 for conducting an update process to increase the current use amount of the user specified as the request originator in response to an execution of the image process with respect to the print request, a user use amount storing part 128 for storing data of the use amount for each of the users, a use restriction processing part 130, and a restriction enforcement noticing part 132. The user use amount storing part 128 is an example of a use amount storing part in the first embodiment.

The use restriction processing part 130 determines whether or not the image process for the print request is restricted. If required, the use restriction is applied. The use restriction processing part 130 maintains a restriction rule to regulate a restriction to be applied when the print request is made by the operator 8 who exceeds the user upper limit value. The restriction rule is determined beforehand based on an operation guideline of the organization. For example, in a case in which the operation guideline strictly regulates the number of output sheets, if exceeding the user limit value, a rule is performed to forcibly disrupt a process concerning the copy process. In another case in which the operation guideline allows a certain amount of sheets for the print process by which the user limit value is exceeded, instead of the forcible disruption, the use restriction is performed to prompt the operator 8 to suppress using the multi-functional apparatus 110 such as an alarm display, a notice of the administrator 4, a forcible change of print setting, or the like. For example, the forcible change of the print setting may be to forcibly change to a double-sided printing, a black and white printing, a double-sided black and white printing, or an integrated printing. The use restriction processing part 130 provides an example of a determining part in the first embodiment.

When the user restriction is required to be applied, the restriction enforcement noticing part 132 informs contents of the user restriction of the operator 8 through the input/output interface 136 or the communication interface 138. For example, the restriction enforcement noticing part 132 displays an alarm to the operator 8 through the input/output interface 136 or the communication interface 138 which received the print request. Also, when the forcible change of the print setting is indicated, the restriction enforcement noticing part 132 displays a screen which displays a message indicating that the print setting is forcibly changed and receives an approval from the operator 8. Accordingly, in keeping with the intention of the operator 8, it is possible to conduct the print process in a case of exceeding the user upper limit value. For example, when the forcible change of the print setting is undesirable, the operator 8 can instruct to cancel the print process. Also, if the operator 8 desires to conduct the print process regardless of the forcible change, the operator 8 can instruct to continue the print process. The restriction enforcement noticing part 132 provides an example of a notifying part in the first embodiment.

FIG. 6B illustrates an operation screen 190 which notifies the forcible change of the print setting of the operator 8 and requires the approval of the operator 8. The operation screen 190 illustrated in FIG. 6B includes an "CANCEL" button 194 for accepting a cancel intention from the operation, and an "OK" button 196 for accepting an approval intention of the forcible change from the operator 8. By displaying the operation screen 190 illustrated in FIG. 6B, in a circumstance in which the use amount of the operator 8 exceeds the user upper limit value and the user restriction is required, the operator 8 can select to intentionally cancel printing out by using the software keyboard or the like, or to accept the forcible change of the printing settings and continue printing out.

Due to printed sheets added by the operator 8, the re-calculation is performed. After the re-calculation, there may be an operator 8 in which the current use amount of the operator 8 exceeds the user upper limit value. The restriction enforcement noticing part 132 can inform the operator 8 a message with contents of the use restriction. The message indicates that the use restriction is required since the current use amount of the operator 8 exceeds the upper limit value. Notice information is stored with an updated time when a user is found in which the current use amount of the user exceeds the user upper limit value for the user. After the re-calculation, when the operator 8 being the user, whose current use amount exceeds the user upper limit value, logs in at a next time, a previous authenticated time is compared with the updated time. If the updated time is later than the previous authenticated time, the above-described notice is conducted by the restriction enforcement noticing part 132.

Similar to the group upper limit value managing part 112, the use restriction processing part 130 provides a user interface through the remote management interface 134 or the input/output interface 136. The administrator 4 can indicate the rule concerning the use restriction to apply for each group by using the user interface. For example, when the "RULE SETTING" button 156b is touched by the administrator 4 at the setting screen 150 illustrated in FIG. 4A, a setting screen 160 is displayed as illustrated in FIG. 4B.

FIG. 4B illustrates the setting screen 160 which is provided by the use restriction processing part 130 and is used to indicate the rule of the use restriction to apply to a group. The setting screen 160 illustrated in FIG. 4B displays the rule to apply to the group, and includes a table 164 used to indicate one or more rules to apply, a "SET" button 162a, and a "CANCEL" button 162b. The table 164 includes items of a checkbox 166a, a number 166b of the rule, and a rule 166c. In the setting screen 160 in FIG. 4B, for example, a rule of forcibly changing to the double-sided printing and another rule of displaying the alarm by a pop up at an operation screen of the operator 8 are indicated. It should be noted that the screen displays illustrated in FIG. 4A and FIG. 4B, FIG. 5A and FIG. 5B, and FIG. 6A and FIG. 6B are examples. Thus, the first embodiment is not specified and limited to these examples.

Figure 7:
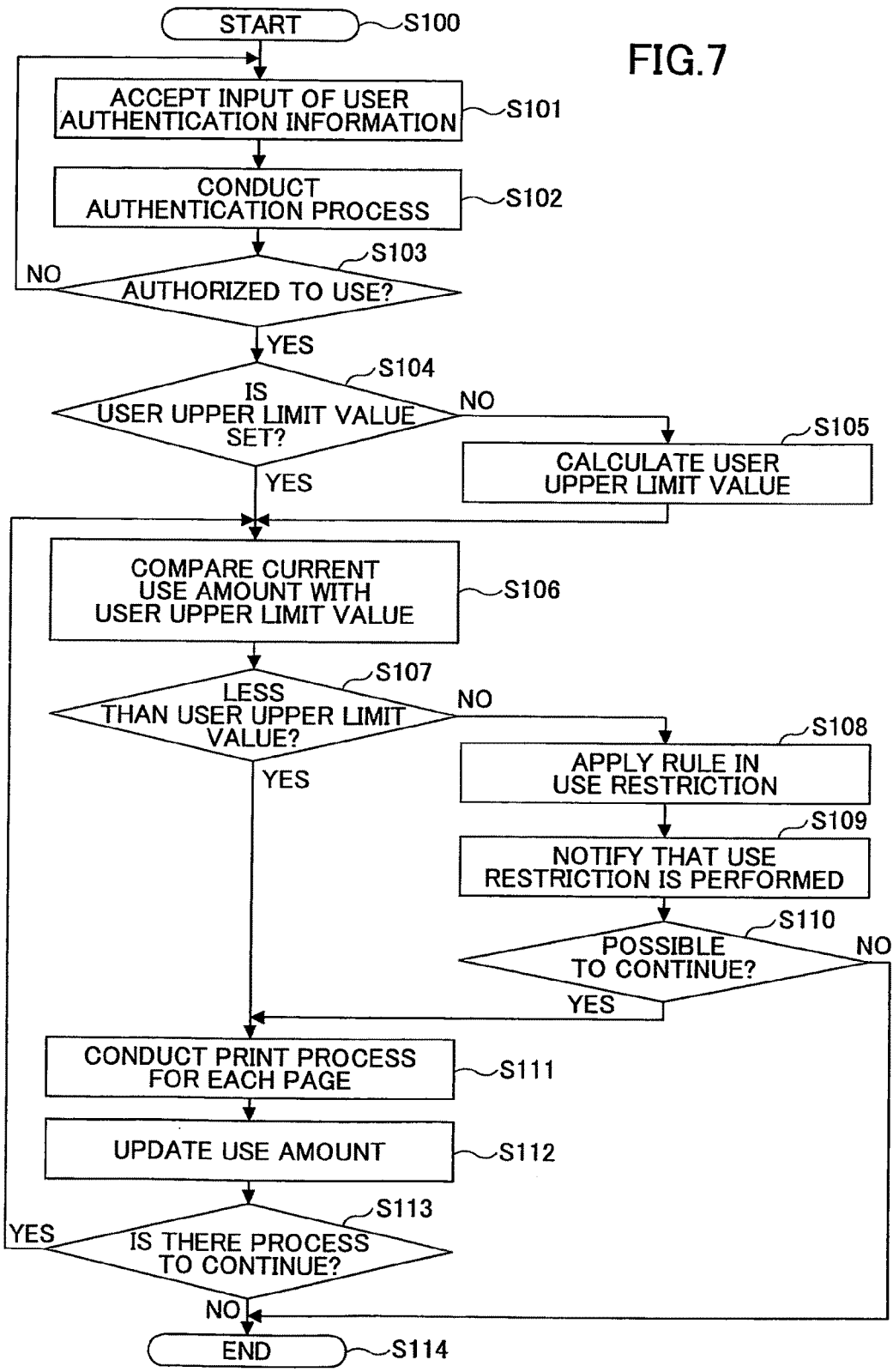
FIG. 7 is a diagram illustrating the flowchart for explaining the process for enforcing a use restriction with respect to a print request, which is conducted by the multi-functional apparatus according to the first embodiment.

In the following, referring to a flowchart, a process for effecting the use restriction for the print request will be described in detail. FIG. 7 is a diagram illustrating the flowchart for explaining the process for effecting the use restriction with respect to the print request, which is conducted by the multi-functional apparatus 110 according to the first embodiment. For the sake of convenience, a case of receiving the print request from the operator 8 through the operation panel 52 is assumed.

The process for effecting the use restriction illustrated in FIG. 7 receives the print request from the operator 8 through the operation panel 52 and starts from step S100. In step S101, the multi-functional apparatus 110 displays an operation screen (for example, the operation screen 180 illustrated in FIG. 6A) at the operation panel 52 to accept an input of a user authentication information from the operator 8. In step S102, the multi-functional apparatus 110 specifies the operator 8 as the user of the request originator by the user specifying part 120, authenticates the operator 8 by the authorization determining part 122 associating with the authentication server 106, and acquires an authentication result including information of the group to which the user of the request originator belongs.

In step S103, the multi-functional apparatus 110 determines whether or not the request originator is a valid user, that is, whether or not the request originator has an authorization to use the multi-functional apparatus 110. In step S103, when it is determined that the request originator is not authorized to use the multi-functional apparatus 110 (NO), the process goes back to the step S101 to request the operator 8 to re-input the user authentication information. On the other hand, in the step S103, when it is determined that the request originator is authorized to use the multi-functional apparatus 110 (YES), the process advances to step S104.

In the step S104, the user upper limit value re-calculating part 124 of the multi-functional apparatus 110 refers to the user upper limit value storing part 116, and determines whether or not the user upper limit value is set for the request originator, that is, an add process is required. In the step S104, when it is determined that the user upper limit value is not set (NO), the process branches to step S105.

In the step S105, the user upper limit value re-calculating part 124 of the multi-functional apparatus 110 sets a standard value of the weight value to the user of the request originator, re-calculates the user upper limit values of the user and other users in the same group, and advances to step S106. On the other hand, in the step S104, when it is determined that the user upper limit value is set (YES), the process directly branches to step S106.

In the step S106, the user use amount updating part 126 of the multi-functional apparatus 110 refers to the user use amount storing part 128, and acquires the current use amount being accumulated for the user of the request originator. The use restriction processing part 130 of the multi-functional apparatus 110 compares the current use amount of the user of the request originator with the user upper limit value of the user, and determines whether or not the current use amount of the user is less than the user upper limit value in step S107. In the step S107, when it is determined that the current use amount is less than the user upper limit value (YES), the image processing part 118 of the multi-functional apparatus 110 conducts the print process for each page in response to the print request in step S111. In step S112, the user use amount updating part 126 of the multi-functional apparatus 110 updates the use amount of the user by adding current pages printed in the print process with respect to the user of the request originator.

In step S113, the multi-functional apparatus 110 determines whether or not a process to be continued for the print request remains. In the step S113, when it is determined that there is no page to print out and no process to continue (NO), the process for effecting the use restriction is terminated in step S114. On the other hand, when it is determined that there is a page to print out and a process to continue (YES), the process goes back to the step S106 to repeat the above-described steps S106 through S113.

Referring back to the step S107, in the step S107, it is determined that the current use amount of the user as the request originator achieves the user upper limit value (NO), the process advances to step S108. In the step S108, the use restriction processing part 130 of the multi-functional apparatus 110 reads out and conducts the rule of the use restriction to be applied to the group to which the user of the request originator belongs. In step S109, the restriction enforcement noticing part 132 of the multi-functional apparatus 110 displays an operation screen (for example, the operation screen 190 illustrated in FIG. 6B), which displays a message indicating that the use restriction is performed and acquires an approval from the operator 8, at the operation panel 52.

In step S110, the multi-functional apparatus 110 determines whether or not a following print process for the print request can be continued. In the step S110, when it is determined that the following print process cannot be continued since a cancel instruction is received from the operator 8 through the operation screen, the print process concerning the print request is cancelled at this stage, and the process for effecting the use restriction is terminated in step S114. On the other hand, when it is determined that the print process concerning the print request can be continued since the approval is received from the operator 8 through the operation screen (YES), the process advances to step S111. For example, in a case of the operation screen 190 illustrated in FIG. 6B, the print setting is forcibly changed to the double-sided black and white print, and then, a print output process is conducted for each page. After that, the process advances to step S112.

In FIG. 7, the use amount is updated by a process for each page of the print request, and it is determined by comparing the updated use amount with the user upper limit value whether or not the updated use amount exceeds the user upper limit value. However, the first embodiment is not limited to this manner. For example, if the use amount is less than the user upper limit value immediately before the print request is received, the print process is successively performed without enforcing the use restriction for the entire print request. Alternatively, in a case in which the use amount required for the print request is predicted, the use amount after the print process is estimated. Only for a particular case in which the estimated use amount after the print process is less than the user upper limit value, the print process is continued without enforcing the use restriction to the entire print request. On the other hand, if the estimated use amount after the print process exceeds the user upper limit value, the use restriction may be enforced to the entire print request, and the print process is continued under the user restriction.

Figure 8:
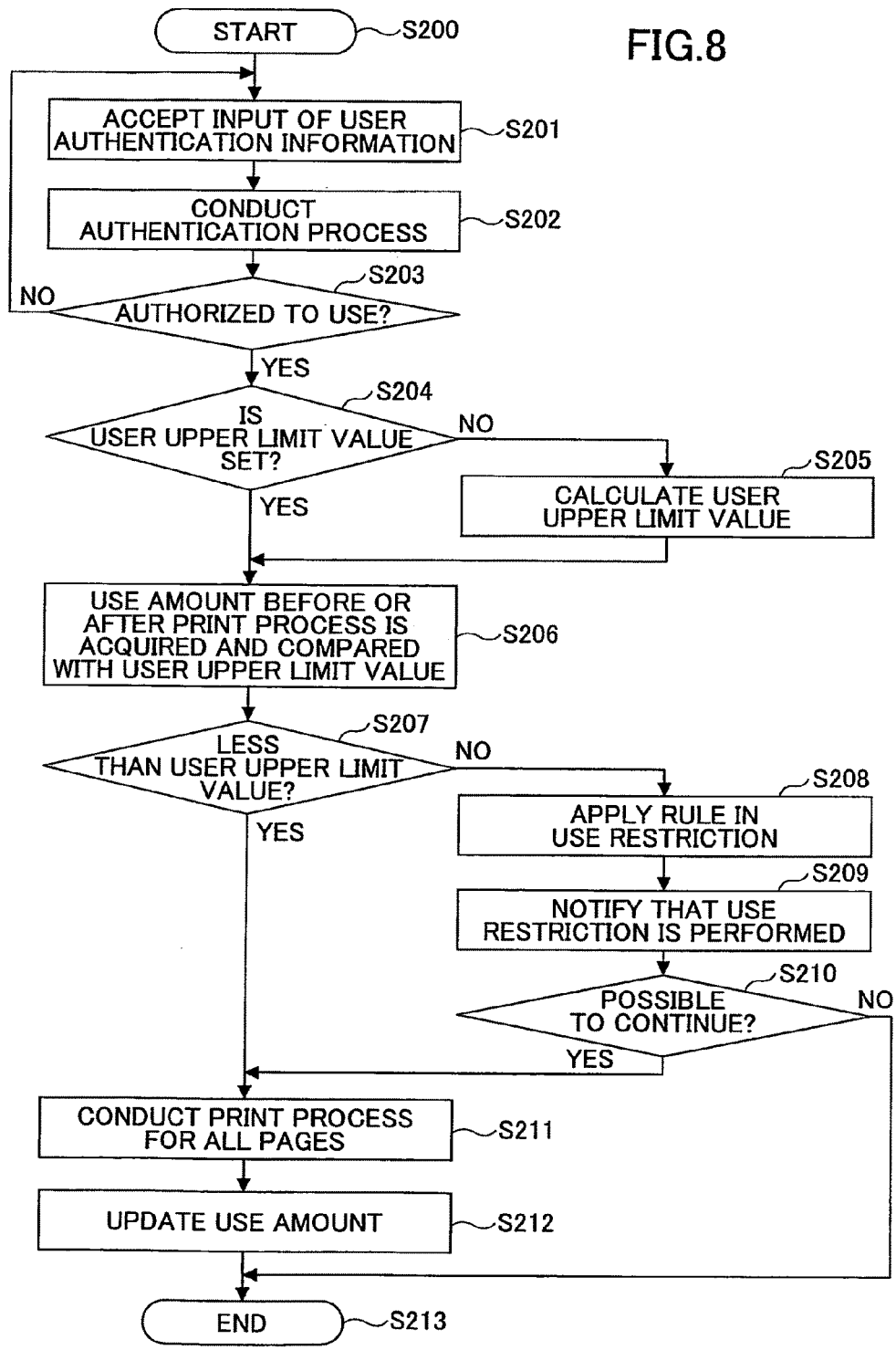
FIG. 8 is a flowchart for explaining another example of the process which is conducted by the multi-functional apparatus to enforce the user restriction to the print process in response to the print request, according to the first embodiment.

FIG. 8 is a flowchart for explaining another example of the process which is conducted by the multi-functional apparatus 110 to enforce the user restriction to the print process in response to the print request. Steps S200 through S205 illustrated in FIG. 8 are the same as the steps S100 through S105 illustrated in FIG. 7, and the explanation thereof will be omitted. In the following, steps S206 through 213 will be described.

In the step S206, the user use amount updating part 126 of the multi-functional apparatus 110 refers to the user use amount storing part 128, and acquires the current use amount of the user as the request originator which is accumulated. The use restriction processing part 130 of the multi-functional apparatus 110 determines whether or not the use amount of the user as the request originator is compared with the user upper limit value, and the use amount after the print process is less than the user upper limit value. Alternatively, in the step S206, in a case in which the print process for the print request is further conducted in addition to the use amount of the user as the request originator, which has been accumulated in the present state, the use amount after the print process is estimated. Then, the use amount after the print process is compared with the user upper limit value. In step S207, it is determined whether or not the use amount after the print process is less than the user upper limit value. Regarding using the use amount before the print process or after the print process for a comparison, it is possible to change based on an operation guideline such as an environment variable.

In the step S207, when it is determined that either one of the use amount before the print process and the use amount after the print process is less than the user upper limit value (YES), in step S211, the multi-functional apparatus 110 conducts the print process for all pages with respect to the print request. In step S212, contents of the user use amount storing part 128 are updated with the use amount after the print process. In step S213, the process for enforcing the use restriction is terminated.

On the other hand, in the step S207, it is determined that the use amount before the print process or the use amount after the print process achieves the user upper limit value (NO), the process advances to the step S208. In the step S208, the multi-functional apparatus 110 reads out the rule to apply in the use restriction. In the step S209, the multi-functional apparatus 110 displays an operation screen (for example, the operation screen 190 illustrated in FIG. 6B) to inform the operator 8 that the use restriction is enforced and to acquire an approval from the operator 8.

In step S210, the multi-functional apparatus 110 determines whether or not a following print process for the print request can be continued. In the step S210, when it is determined that the following print process cannot be continued (NO), the entire print process for the print request is cancelled, and the process advances to step S213. Then, the process for enforcing the use restriction is terminated. On the other hand, in the step S210, when it is determined that the following print process can be continued (YES), the process advances to step S211. For example, after the process changes the print setting to the double-sided black and white printing, the process conducts a print output process for the print request, and is terminated in the step S213.

According to the first embodiment, the group upper limit value of the use amount is defined for each group. Moreover, the user upper limit value is calculated for each user with maintaining coherence with the group upper limit value of an upper layer, by using the weight value or the standard value of the weight value. The weight value is set beforehand by the administrator 4 for each of the users who belongs to the group and is authenticated. The standard value of the weight value is set beforehand for a user who is automatically recognized. Accordingly, the user upper limit value is allocated to each of the users with higher priority, for whom the weight values are set by the administrator 4. In addition, as far as other users who belong to the group as valid users, even for the other users to whom the weight values are not set by the administrator 4, the other users can use the multi-functional apparatus 110 within the group upper limit value. Furthermore, it is possible to flexibly correspond to the addition of a user. Also, it is possible to reduce a workload of the administrator 4, and to effectively and flexibly restrict use of the functions provided by the multi-functional apparatus 110.

Since the rule is defined to correspond to a case of exceeding the user upper limit value, it is possible to realize a demand of the administrator 4 so that the user upper limit value is strictly managed to use the multi-functional apparatus 110. Also, it is possible to realize a demand so that the user upper limit value is managed as a target value to improve intention of the users. Thus, the first embodiment can correspond to various demands.

According to the first embodiment, the authentication server 106 is provided separately from the multi-functional apparatus 110. However, the multi-functional apparatus 110 may include functions of the authentication server 106. Function parts concerning the use restriction included in the multi-functional apparatus 110 may be realized in a separate server. In this modification, regarding multiple image processing apparatuses installed in the network system 100, it is possible to centralize a management of the user restriction as a whole system. In the following, a second embodiment of a network system, in which a use restriction server for centralizing the management of the use restriction is separately provided, will be described. In the second embodiment, a network system 200 realizes similar functions to the network system 100 in the first embodiment. In the following, different functions will be mainly described.

Figure 9:
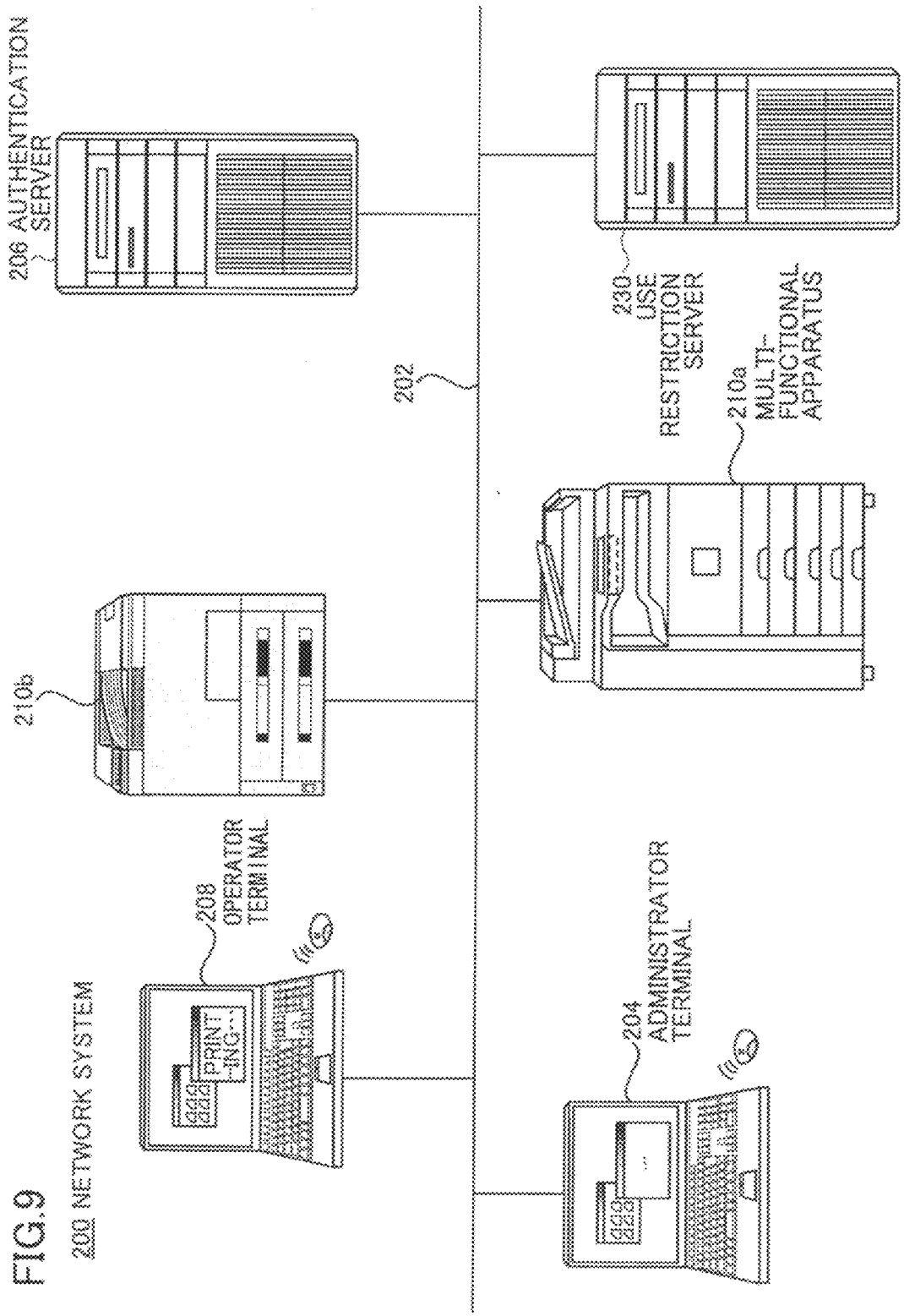
FIG. 9 is a schematic diagram illustrating a network system according to a second embodiment.

FIG. 9 is a schematic diagram illustrating the network system 200 according to the second embodiment. Similar to the first embodiment, the network system 200 illustrated in FIG. 9 includes an administrator terminal 204, an authentication server 206, an operator terminal 208, a multi-functional apparatus 210a, a laser printer 210b, and a use restriction server 230, which are mutually connected through a network 202. In the second embodiment, the multi-functional apparatus 210a and the laser printer 210b provide image processing apparatuses for enforcing the use restriction for the operator 8 under a centralized management of the use restriction server 230 according to the second embodiment.

The administrator terminal 204 according to the second embodiment is a terminal which can access a setting management function of a use restriction application through a remote management interface provided by the use restriction server 230, and is used by the administrator 4 when the administrator 4 conducts various settings of the use restriction application.

Figure 10:
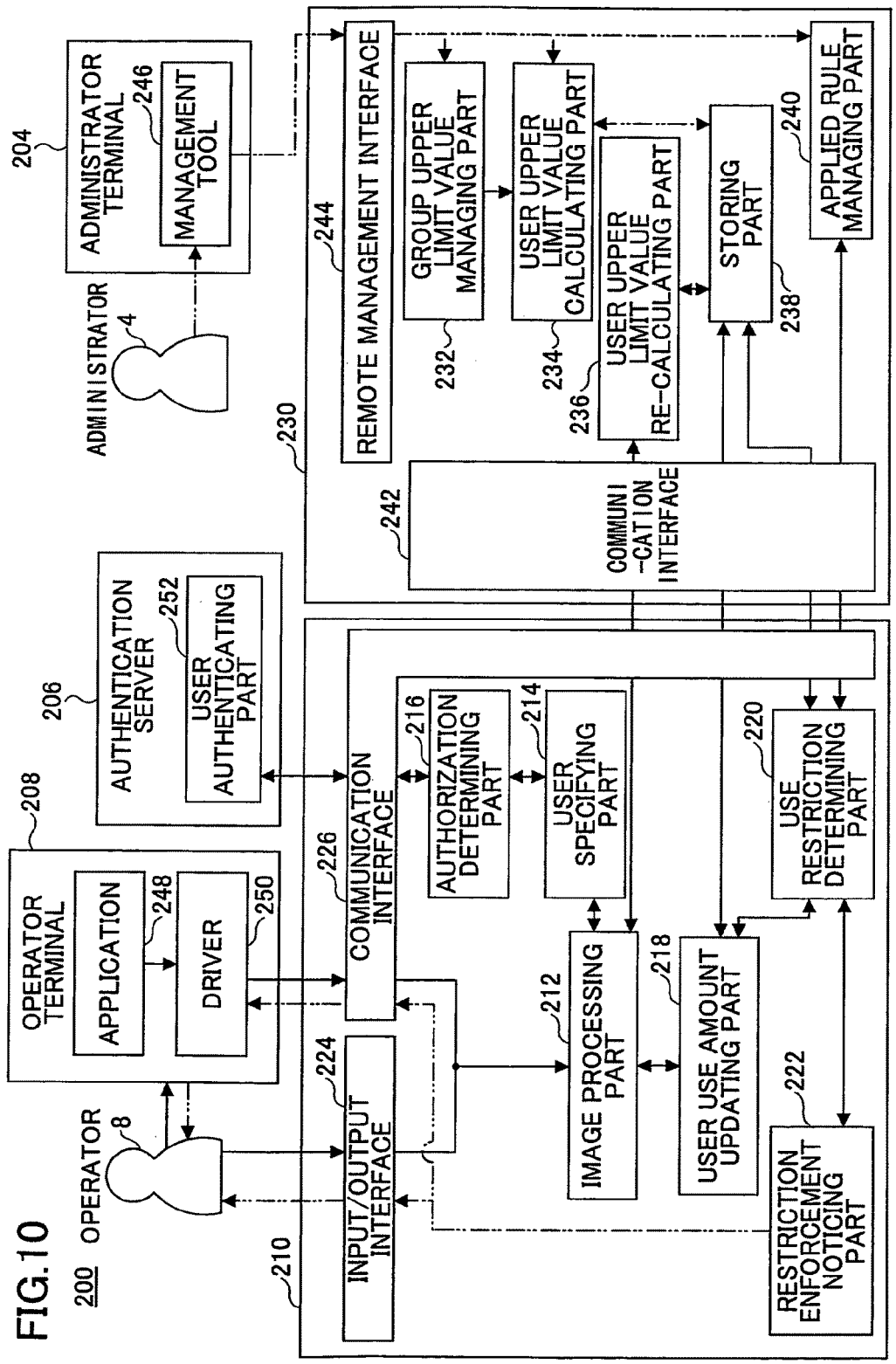
FIG. 10 is a block diagram illustrating a functional configuration realized in the network system according to the second embodiment.

FIG. 10 is a block diagram illustrating a functional configuration realized in the network system 200 according to the second embodiment. In the network system 200 according to the second embodiment, a part of the functions in the network system 100 according to the first embodiment illustrated in FIG. 3, which is realized by the multi-functional apparatus 110, can be realized by the use restriction server 230.

The use restriction server 230 according to the second embodiment includes a group upper limit value managing part 232 for managing the group upper limit value, a user upper limit value calculating part 234 for calculating the user upper limit value for each of the users who belong to the same group for each of the groups, a user upper limit value re-calculating part 236, a storing part 238 for storing the user upper limit value calculated by the user upper limit value calculating part 234 or the user upper limit value re-calculating part 236 and data of an actual use amount for each user, and an applied rule managing part 240.

The group upper limit value managing part 232 and the user upper limit value calculating part 234 are functional parts similar to the group upper limit value managing part 112 and the user upper limit value calculating part 114 in the first embodiment, respectively. Each of the group upper limit value managing part 232 and the user upper limit value calculating part 234 provides a user interface through a remote management interface 244 of the use restriction server 230.

FIG. 11A and FIG. 11B, and FIG. 12 are diagrams illustrating setting screens displayed at a display unit of the administrator terminal 204 according to the second embodiment. In the second embodiment, levels are prepared beforehand to assign to the users, and are associated with an upper limit value (hereinafter, called tentative user upper limit value) of the use amount which is tentatively assigned to each of the users. In a case of calculating the user upper limit value for each of the users, the user upper limit value is allocated to each of the user based on the tentative user upper limit value, so that a total of the user upper limit values in a group is within the group upper limit value of the group. That is, in the second embodiment, instead of the weight value in the first embodiment, the user upper limit value calculating part 234 stores a value of the level by associating with the user.

FIG. 11A is a diagram illustrating a setting screen 260A which is provided by the user upper limit value calculating part 234 to determine the user upper limit value to assign to each of the users. The setting screen 260A illustrated in FIG. 11A includes a table 262, "REGISTER/CHANGE" buttons 264a, 264b, and 264c, a "SET" button 266a, and a "CANCEL" button 266b.

The table 262 includes a column 263a for indicating a level, a column 263b for indicating the tentative user upper limit value of each of the users, a column 263c for indicating the number of users possible to allocate for each level, and a column 263d for indicating the number of users actually registered for each level. In the setting screen 260A illustrated in FIG. 11A, for example, when one of the "REGISTER/CHANGE" buttons 264a, 264b, and 264c is clicked, a setting screen 270 illustrated in FIG. 11B is called out to display.

FIG. 11B is a diagram illustrating the setting screen 270 for adding or deleting a user to or from a group. The setting screen 270 illustrated in FIG. 11B includes a "SET" button 272a, a "CANCEL" button 272b, a list box 274 for displaying a list of registered users, an "ADD USER" button 276a for registering a user, and a "DELETE USER" button 276b.

When the "ADD USER" button 276a is clicked, the user restriction server 230 appropriately communicates with the authentication server 206, and displays a list of users belonging to the same group in a setting screen (for example, a setting screen 270 in FIG. 11B) at the display unit of the administrator terminal 204. The administrator 4 selects and registers a user to add as a subject of the use restriction from the list. On the other hand, if a user is selected in the list box 274 and the "DELETE USER" button 276b is clicked, data of the selected user (a "USER G" emphasized in FIG. 11B) are deleted from registration data of the level to which the selected user is assigned.

By using the setting screen 270 illustrated in FIG. 11B, the administrator 4 adds or deletes a desired user in the list box 274, and clicks the "SET" button 272a. In response to this click, each of users is registered to a level "1" by setting contents. FIG. 12 is a diagram illustrating a setting screen 260B displayed after users are registered for each level by using the setting screen 270 illustrated in FIG. 11B. As illustrated in FIG. 11A and FIG. 11B, the number of users is varied based on the number of registered users for each level, and visibly displayed. Accordingly, the administrator can easily comprehend the number of users possible to assign and a current assignment state.

The tentative user upper limit value is a temporary value, and an actual user upper limit value is calculated by deducting a total of the tentative user upper limit values from the group upper limit value and dividing a difference equally to the users or based on the levels of the users. In the second embodiment, the tentative user upper level value is associated with each of levels. Thus, even before setting the user upper values, the administrator 4 can comprehend approximately an upper limit value for the number of sheets. In the second embodiment, if it is required to assign additional users by exceeding the number of users possible to assign to a level shown in the table 262, the administrator 4 may be informed by an alarm such that "since your setting exceeds the group upper limit value, the setting value for each user becomes less than a displayed value." The calculated user upper limit value is stored in the storing part 238.

A method for calculating the user upper limit value is not limited to the above-described method. Instead of associating each level with the tentative user upper limit value, a difference between the tentative user upper limit values of levels may be set.

Referring to FIG. 10 again, the user upper limit value re-calculating part 236 according to the second embodiment is a similar functional part to the user upper limit value re-calculating part 124 according to the first embodiment. In response to an inquiry from the multi-functional apparatus 210a, the user upper limit value re-calculating part 236 determines whether or not the user upper limit value is set for the user of the request originator. If the user upper limit value is not set, the user upper limit value re-calculating part 236 assigns a default level to the user of the request originator, and re-calculates the user upper limit value for each of users including the request originator in a group to which the user of the request originator belongs.

The storing part 238 includes the functions of the user upper limit value storing part 116 and the user use amount storing part 128 in the first embodiment. The storing part 238 in the second embodiment stores the use amount and the user upper limit value for each user, and maintains the use amount and the user upper limit value by classifying into print modes such as a color print, a single-sided print, an integrated print, and the like. The storing part 238 responds to the inquiry from the multi-functional apparatus 210a and returns a respective value to the multi-functional apparatus 210a.

FIG. 13 is a diagram illustrating a data structure of a use management table 10 stored in the storing part 238 according to the second embodiment. The management table 10 illustrated in FIG. 13 includes a record for each of the users. Each of records includes a "USER NAME" column, a "TOTAL UPPER LIMIT VALUE" column, a "TOTAL USE AMOUNT" column, a "UPPER LIMIT VALUE OF COLOR PRINT" column, a "USE AMOUNT OF COLOR PRINT" column, a "UPPER LIMIT VALUE OF SINGLE-SIDED PRINT" column, a "USE AMOUNT OF SINGLE-SIDED PRINT" column, a "UPPER LIMIT VALUE OF REGULAR PRINT" column, AND a "USE AMOUNT OF REGULAR PRINT" column. The regular print is used as opposed to the integrated print, and indicates a print mode which does not integrate multiple pages in one page.

By applying the data structure illustrated in FIG. 13A, it is possible to maintain a ratio of the color print to the black and white print, a ratio of the single-sided print to the double-sided print, and a ratio of the regular print to the integrated print, in a total upper limit value. An upper limit value of the color print, an upper limit value of the single-sided print, and an upper limit value of the regular print may be calculated based on respective predetermined ratios in which the user upper limit value is used to be the total upper limit value. The level is assigned to each of the color print, the single-sided print, and the regular print by the user interface of the user upper limit value calculating part 234.

Referring back to FIG. 10, the applied rule managing part 240 is a functional part to manage the rule which regulates the use restriction to apply in a case of exceeding the user upper limit value or the group upper limit value, and to perform a part of the function of the use restriction processing part 130 according to the first embodiment. In the second embodiment, as described above, the use amount and the upper limit value are independently maintained for the entire and each of print modes the print modes. Thus, it is possible to apply the use restriction independently for the entire and each of print modes the print modes. For example, a rule may be applied in which only an alarm is performed as a moderate use restriction for the total upper limit value, and a forcible change to the black and white print is performed for the color print. Similarly, the regular print may be forcibly changed to the integrated print. Also, the single-sided print may be forcibly changed to the double-sided print.

The multi-functional apparatus 210a according to the second embodiment includes an image processing part 212, a user specifying part 214, an authorization determining part 216, a user use amount updating part 218, a use restriction determining part 220, and a restriction enforcement noticing part 222. The use restriction determining part 220 communicates with the applied rule managing part 240, acquires the rule to apply, and determines whether or not the use restriction is applied for the image process in response to the print request which is conducted by the operator 8. The use restriction is appropriately applied if necessary.

The restriction enforcement noticing part 222 informs the operator 8 contents of the use restriction through an input/output interface 224 or a communication interface 226 if it is necessary to apply the use restriction. For example, the restriction enforcement noticing part 222 displays an alarm for the operator 8 through the input/output interface 224 or the communication interface 226 at which the print request is made, when the alarm is applied. The restriction enforcement noticing part 222 display a screen to display a message indicating that the print setting is forcibly changed, and to receive an approval from the operator 8, if the forcible change of the print setting is indicated. The restriction enforcement noticing part 222 provides an example of a determining part in the second embodiment.

As illustrated in FIG. 13, in a case of exceeding the upper limit value of the color print in a middle of the print process in response to the print request, it is not preferable if the print setting is changed during a single job. Thus, it is preferred to display a screen in advance to have the operator 8 determine a continuation of the print process, the screen showing a message such as "Because a sheet count will reach the upper limit of the color print during the print process, it is possible to change to the black and white print from the beginning?"

Regarding the user restriction, there is a demand of the administrator in which the upper limit value may be assured in a long term with allowing an excess amount over the upper limit value in a short term. In order to respond to this demand, in the second embodiment, the restriction enforcement noticing part 222 inquires an intention of the operator 8 concerning a process of borrowing the excess amount in advance or an application for an approval of the administrator 4, and displays a screen to receive the intention of the operator 8. The upper limit value for the use amount is defined at a constant period such as every month. The process of borrowing the excess amount in advance is performed to carry the use amount forward to a next period after a current period. In this case, the excess amount over the upper limit value of the current period is added to the use amount of the next period. Information of a forwarded amount is stored in the storing part 238, and is referred to by the user upper limit value calculating part 234 and the user upper limit value re-calculating part 236 when the user upper limit value is calculated.

On the other hand, the application for the approval is to request the administrator 4 to allow exceptionally releasing the use restriction and performing a process concerning the print request. In this case, an inquiry is sent to the administrator 4 by electronic mail or instant message. After the approval of the administrator 4 is acquired, the process concerning the print request is continued. When the use amount of the print request is exceptionally allowed for the operator 8 who is the user of the request originator, the use amount of the print request is deducted from the group upper limit value of the group to which the user belongs, and the user upper limit value is re-calculated for each of other users in the group. Also, the upper limit value may be provided to a use amount to be forwarded and a use amount for which the use restriction is exceptionally released by the application of the approval.

Figure 14:
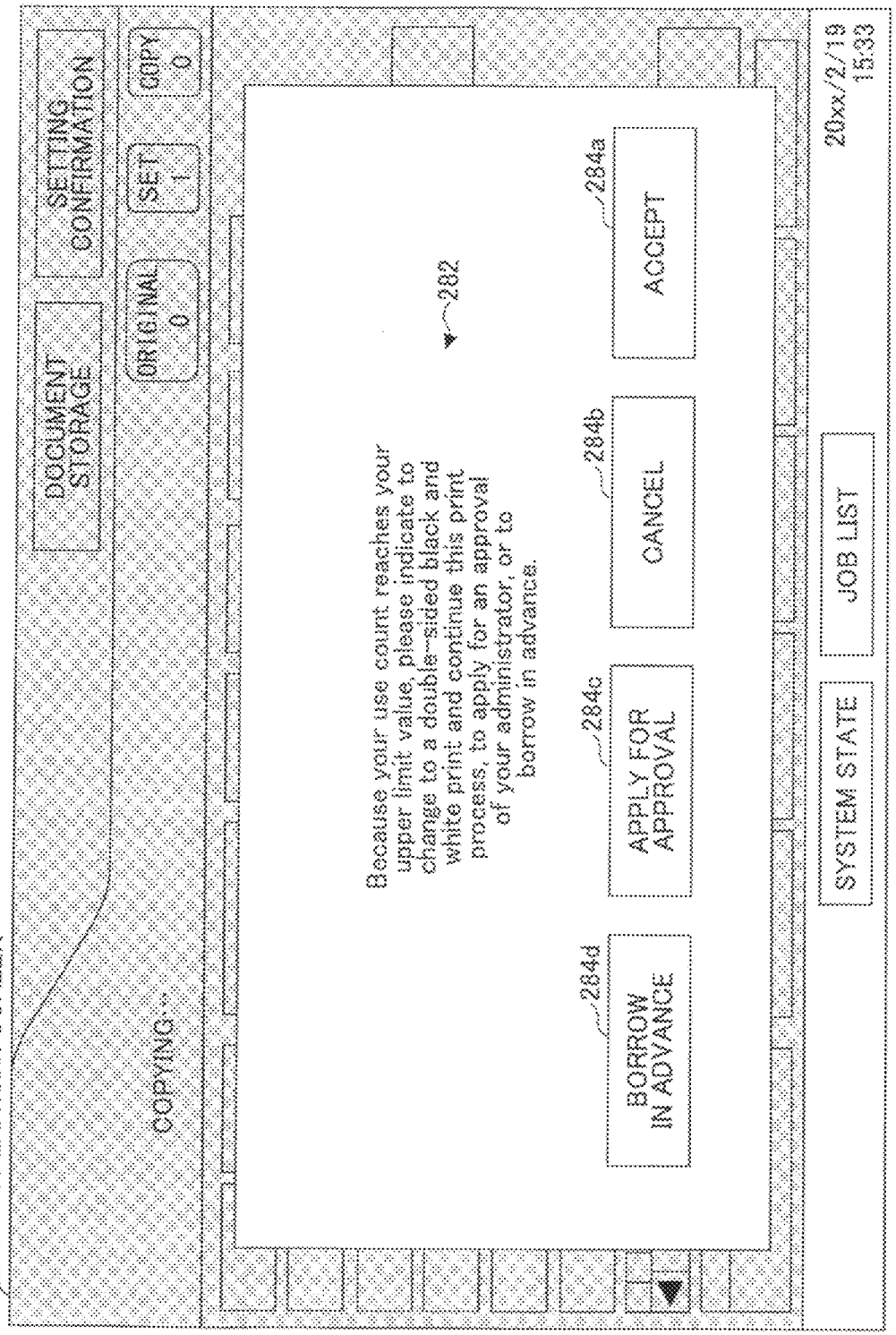
FIG. 14 is a diagram illustrating an operation screen at which an operator makes a selection concerning the use restriction.

FIG. 14 illustrates an operation screen 280 at which the operator 8 makes a selection concerning the use restriction. By displaying the operation screen 280, the operator 8 is inquired to accept the forcible change of the print setting, cancel the print process, apply the approval of the administrator 4 to continue the print process, or perform the process of borrowing the excess amount in advance. Then, the operation screen 280 accepts an instruction from the operator 8. The operation screen 280 illustrated in FIG. 14 includes a message 282, an "ACCEPT" button 284*a* for the operator 8 to accept changing the print setting, a "CANCEL" button 284*b* for the operator 8 to cancel the print process, an "APPLY FOR APPROVAL" button 284*c* for the operator 8 to apply for the approval of the administrator 4, and a "BORROW IN ADVANCE" button 284*d*.

By providing the operation screen 280 as illustrated in FIG. 14, in a state in which the use amount exceeds the upper limit value, the operator 8 can select to continue a print output by accepting a change of the print setting, cancel the print process, demand the approval of the administrator 4 concerning the excess amount, or perform the process of borrowing the excess amount in advance, by using a software keyboard or the like of the multi-functional apparatus 210*a* by his/her intention. Also, in a case of an urgent print, the operator 8 may tentatively select the process of borrowing the excess amount in advance. After that, the operator 8 may apply the approval of the administrator 4 concerning the excess amount to cancel a debt of the excess amount. Therefore, in keeping with the intension of the operator 8, it is possible to flexibly conduct a process in a case of exceeding the upper limit value. That is, by allowing the excess amount over the upper limit value in a short term, it is possible to respond to the demand of the administrator 4 such that the upper limit value is assured in thes long term.

Figure 15:
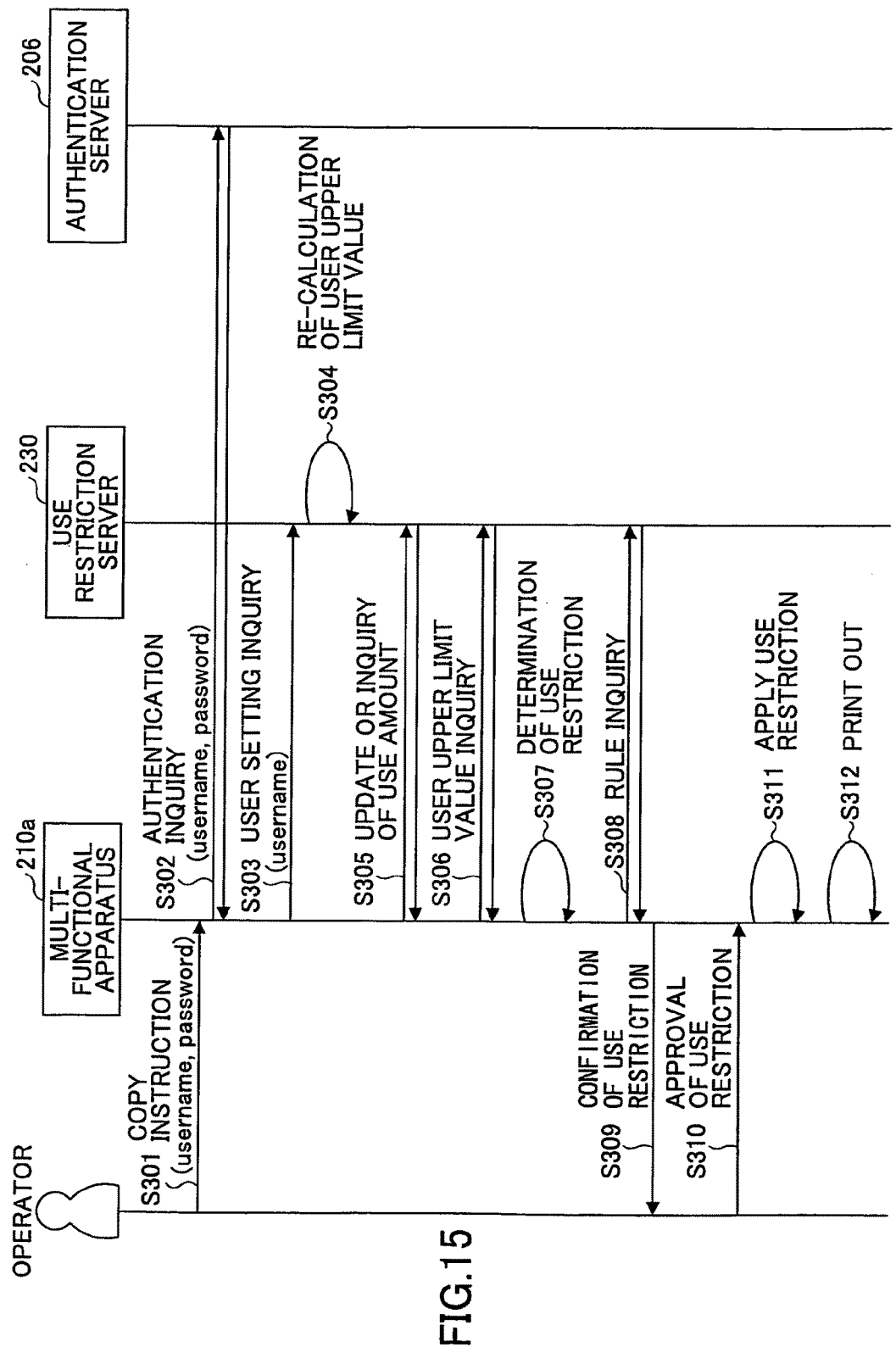
FIG. 15 is a sequence diagram for explaining the process conducted in the network system to enforce the use restriction for the print process in response to the print request, according to the second embodiment.

In the following, a process according to the second embodiment, which enforces the use restriction with respect to the print request, will be described with reference to FIG. 15. FIG. 15 is a sequence diagram for explaining the process conducted in the network system 200 to enforce the use restriction for the print process in response to the print request, according to the second embodiment.

When a user name and a password are received from the operator 8 through the operation panel 52, the process illustrated in FIG. 15 is began from step S301. In step S302, the multi-functional apparatus 210*a* specifies the operator 8 as the request originator to be the user by the user specifying part 214, authenticates the operator 8 by the authorization determining part 216 associating with the authentication server 206, and determines whether or not the operator 8 as the request originator is a valid user.

When it is determined that the operator 8 is the valid user, in step S303, the multi-functional apparatus 210*a* inquires the user upper limit value re-calculating part 236 of the use restriction server 230 whether or not the user upper limit value is set for the user of the request originator. When the user upper limit value is not set for the user of the request originator, in step S304, the use restriction server 230 re-calculates the user upper limit value for each of the users including the request originator in the group, and stores the user upper limit value for each of the users in the storing part 238.

In step S305, the user use amount updating part 218 of the multi-functional apparatus 210*a* inquires the storing part 238 of the use restriction server 230 to update the use amount of the user of the request originator and sending back the updated use amount. In step S306, the use restriction determining part 220 of the multi-functional apparatus 210*a* inquires the user upper limit value set for the user of the request originator to the storing part 238 of the use restriction server 230.

In step S307, the use restriction determining part 220 of the multi-functional apparatus 210*a* determines whether or not the use amount of the user of the request originator is less than the user upper limit value, and whether or not the use restriction is required. When it is confirmed that the use amount of the user of the request originator exceeds the user upper limit value, in step S308, the use restriction determining part 220 of the multi-functional apparatus 210*a* inquires about the rule to apply in the use restriction to the applied rule managing part 240 of the use restriction server 230.

When the rule to apply in the use restriction is received, in step S309, the multi-functional apparatus 210*a* displays an operation screen (for example, the operation screen 280 illustrated in FIG. 14) through the operation panel 52. For example, the multi-functional apparatus 210*a* confirms that the operator 8 approves a change of the print setting to continue the print process. In step S310, an instruction of the approval of the operator 8 is received. Then, in step S311, the multi-functional apparatus 210*a* applies the print setting which is approved by the operator 8. In step S312, the print output concerning the print request is performed.

In the second embodiment, the multi-functional apparatus 210*a* separately inquires about the use amount of the user of the request originator and the user upper limit value. Alternatively, the multi-functional apparatus 210*a* may simultaneously inquire about both the use amount of the user of the request originator and the user upper limit value. Instead, a result from comparing the use amount with the user upper limit value may be directly acquired.

As described above, according to the first and second embodiments, a group threshold is defined for the use amount for each of groups. A member threshold is calculated for each of members in a lower layer by maintaining coherence to the group threshold in a higher layer in accordance with a priority which is determined beforehand for each of members in a group. Thus, it is possible to appropriately allocate the group threshold, which is assigned to a group, to the members to which the priority is set by the administrator 4.

Accordingly, regarding each of the use amounts of the functions provided by the image processing apparatuses, it is possible to provide an image processing apparatus, a server, an image processing system, a use restriction method, and a recording medium thereof, which can flexibly and effectively realize a hierarchical management to manage a threshold of the use amount for each of members in a lower layer (for example, the user upper limit value of each of the users in the group), while maintaining coherence with a threshold of the use amount for a member in a higher layer (for example, the group upper limit value of the group to which the users belong).

In the first and second embodiments, as an example of the image processing apparatus, the multi-functional apparatuses 110 and 210*a* are mainly described. However, the image processing apparatus may be a printer, a copier, and the like, and also may function as an image reading apparatus such as a scanner, or an image transmission apparatus such as a facsimile. The server may be any computer apparatus such as a personal computer, a work station, or the like.

The above-described function can be realized by a program written in an existing programming language or an object oriented programming language such as an assembler, a C language, a C++ language, a Java language, or the like which can be executed by a computer. The program may be stored in and allocated by a recording medium such as a ROM (Read Only Memory), an EEPROM (Electrically Erasable Programmable Read-Only Memory), an EPROM (Erasable Programmable Read Only Memory), a flash memory, a flexible disk, a CD-ROM (Compact Disk Read Only Memory), a CD-RW (Compact Disc-ReWritable), a DVD (Digital Versatile Disk), an SD (Secure Digital) memory card, a MO (Magneto-Optical disk), and the like.

The present invention is not limited to the specifically disclosed embodiments, and variations and modifications may be made without departing from the scope of the invention.

The present application is based on the Japanese Priority Patent Application No. 2010-021941 filed on Feb. 3, 2010, the entire contents of which are hereby incorporated by reference.

What is claimed is:
1. An apparatus, comprising:
 a first setting registry part configured to register a first threshold of usage for the apparatus;
 a second setting registry part configured to register a value of a priority for multiple users, the value of the priority used to determine a second threshold for each of the multiple users, the second threshold indicating a threshold of usage for each of the multiple users;
 a setting part configured to allocate the second threshold for each of the multiple users automatically based on the first threshold and the value of the priority for each of the multiple users such that a sum of the second thresholds is less than the first threshold;
 a threshold storing part configured to store the first and second thresholds; and
 a use amount storing part configured to store a value of the use amount for each of the multiple users,
 wherein the second threshold and the value of the use amount for each of the multiple users are used for one of management and restriction of usage for each of the multiple users.

2. The apparatus as claimed in claim 1, wherein the priority is an allocation ratio of the second threshold.

3. The apparatus as claimed in claim 1, wherein
 the value of the priority is one of multiple levels, each level being associated with a setting value of usage for determining the second threshold,
 if a sum of the setting values for all of the multiple users is less than the first threshold, the setting part automatically allocates the setting value associated with the level for each of the multiple users as the second threshold for each of the multiple users, and
 if the sum of the setting values for all of the multiple users is not less than the first threshold, the setting part automatically allocates an adjusting value as the second threshold for each of the multiple users, the adjusting value determined based on the first threshold and the setting value of each of the multiple users such that the sum of the second thresholds is less than the first threshold.

4. The apparatus as claimed in claim 1, wherein
 the value of the priority is one of multiple levels each being associated with a difference in a value of usage between levels, and
 the setting part allocates the second threshold for each of the multiple users automatically based on the first threshold and the level of each of the multiple users such that the sum of the second thresholds is less than the first threshold and the difference in the value of usage between levels is maintained.

5. The apparatus as claimed in claim 1, further comprising:
 a third setting registry part configured to register a fixed value for one or more fixed value users as the second threshold for the one or more fixed value users,
 wherein the setting part allocates the second threshold for each of the multiple users except the one or more fixed value users, the allocation based on the value of the priority for each of the multiple users and a value subtracting a sum of the fixed values from the first threshold.

6. The apparatus as claimed in claim 1, wherein if, while one of changing the second threshold for a user, adding the user to the multiple users, and deleting the user from the multiple users, the apparatus detects that the use amount for the user exceeds the second threshold, the setting part excludes the user exceeding the second threshold from the multiple users and sets the second threshold for each of the remaining multiple users.

7. The apparatus as claimed in claim 1, wherein when a user of the multiple users is deleted, the setting part deducts the use amount of the user from the first threshold and determines the second threshold of the user.

8. The apparatus as claimed in claim 1, wherein if the apparatus detects that a second threshold has not been set for a new user, the second threshold is set for the new user based on a standard value of the priority which is determined beforehand.

9. The apparatus as claimed in claim 1, wherein the first threshold and the second threshold are periodically maintained to set for a next period by forwarding a difference between the use amount at an expiration of a current period and a respective threshold of the first threshold and the second threshold.

10. The apparatus as claimed in claim 1, wherein the apparatus determines whether or not the use amount for a request originator exceeds the second threshold in response to a use request, a process of the use request is performed and the use amount of the request originator is updated when the use amount does not exceed the second threshold, and a rule, which regulates the restriction is applied when the use amount exceeds the second threshold.

11. A system, the system comprising:
a server, the server including,
a first setting registry part configured to register a first threshold of usage,
a second setting registry part configured to register a value of a priority for multiple users, the value of the priority used to determine a second threshold for each of the multiple users, the second threshold indicating a threshold of usage for each of the multiple users,
a setting part configured to allocate the second threshold for each of the multiple users automatically based on the first threshold and the value of the priority for each of the multiple users such that a sum of the second thresholds is less than the first threshold,
a threshold storing part configured to store the first and second thresholds, and
a use amount storing part configured to store a value of a use amount for each of the multiple users; and
one or more apparatus configured, to one of manage and restrict usage for each of the multiple users based on the second threshold and the value of the use amount for each of the multiple users.

12. The system as claimed in claim 11, wherein if the system detects that a second threshold has not been set for a new user, the second threshold is set for the new user based on a standard value of the priority which is determined beforehand.

13. The system as claimed in claim 11, wherein the one or more apparatus further comprises:
a user interface configured to announce an update of the second threshold when a user of the multiple users logs in after the second threshold of the user is changed in a desired period.

14. The system as claimed in claim 11, wherein the one or more apparatus determines whether or not the use amount for a request originator exceeds the second threshold in response to a use request, a process of the use request is performed and the use amount of the request originator is updated when the use amount does not exceed the second threshold, and a rule that regulates the restriction is applied when the use amount exceeds the second threshold.

15. A method for managing and restricting usage in an image processing apparatus, the method comprising:
registering a first threshold of usage for an apparatus;
registering a value of a priority for multiple users;
determining a second threshold for each of the multiple users based on the value of the priority, the second threshold indicating a threshold of usage for each of the multiple users;
allocating the second threshold for each of the multiple users automatically based on the first threshold and the value of the priority for each of the multiple users such that a sum of the second thresholds is less than the first threshold;
storing the first and second thresholds;
storing a value of the use amount for each of the multiple users;
managing and restricting usage for each of the multiple users based on the second threshold and the value of the use amount for each of the multiple users.

16. The method as claimed in claim 15, further comprising:
setting the second threshold for the new user based on a standard value of the priority, which is determined beforehand, if the system detects that a second threshold has not been set for a new user.

17. The method as claimed in claim 15, further comprising:
announcing an update of the second threshold when a user of the multiple users logs in after the second threshold of the user is changed in a desired period.

18. The method as claimed in claim 15, further comprising:
determining whether or not the use amount for a request originator exceeds the second threshold in response to a use request;
performing a process of the use request and updating the use amount of the request originator when the determining determines that the use amount does not exceed the second threshold; and
applying a rule that regulates the restriction when the determining determines that the use amount exceeds the second threshold.

19. The method as claimed in claim 15, further comprising:
updating, for target users to which the second threshold is allocated based on the first threshold and the value of the priority, the second threshold based on the first threshold and the value of the priority after a quantity of the target users changes.

20. The apparatus as claimed in claim 1, wherein if a quantity of target users, to which the second threshold is allocated based on the first threshold and the value of the priority, is changed, the second threshold is updated based on the first threshold and the value of the priority with respect to the target users after the quantity of the target users is changed.

* * * * *